(12) United States Patent
Jang et al.

(10) Patent No.: US 12,386,552 B2
(45) Date of Patent: Aug. 12, 2025

(54) OPERATION METHOD OF UNIVERSAL FLASH STORAGE HOST AND OPERATION METHOD OF UNIVERSAL FLASH STORAGE SYSTEM

(71) Applicant: Samsung Electronics Co., Ltd., Suwon-si (KR)

(72) Inventors: Youngjoon Jang, Hwaseong-si (KR); Minji Kim, Seoul (KR); Seungil Kim, Suwon-si (KR); Hyung-Kyun Byun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/655,816

(22) Filed: May 6, 2024

(65) Prior Publication Data
US 2024/0354029 A1  Oct. 24, 2024

Related U.S. Application Data

(63) Continuation of application No. 17/579,665, filed on Jan. 20, 2022, now Pat. No. 12,014,079.

(30) Foreign Application Priority Data

Feb. 5, 2021 (KR) .................. 10-2021-0016934
Mar. 11, 2021 (KR) .................. 10-2021-0031915

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)

(58) Field of Classification Search
CPC ..... G06F 3/0656; G06F 3/0604; G06F 3/0679
USPC .......................................................... 711/154
See application file for complete search history.

(56) References Cited

U.S. PATENT DOCUMENTS

| 8,001,356 B2 | 8/2011 | Im et al. |
|---|---|---|
| 9,141,532 B2 | 9/2015 | Horn |
| 9,372,788 B2 | 6/2016 | Gu et al. |
| 10,089,031 B2 | 10/2018 | Seo et al. |
| 10,545,685 B2 | 1/2020 | Tanpairoj et al. |
| 10,635,344 B2 | 4/2020 | Agombar et al. |
| 10,678,685 B2 | 6/2020 | Hsu et al. |
| 11,645,007 B2 * | 5/2023 | Yoon .................... G06F 3/0659 711/103 |
| 12,265,729 B1 * | 4/2025 | Sambangi ............ G06F 3/0656 |
| 2008/0189452 A1 | 8/2008 | Merry et al. |
| 2014/0019707 A1 | 1/2014 | Benhase et al. |
| 2015/0067281 A1 | 3/2015 | Jones et al. |

(Continued)

*Primary Examiner* — Than Nguyen
(74) *Attorney, Agent, or Firm* — Harness, Dickey & Pierce, P.L.C.

(57) ABSTRACT

An operation method of a universal flash storage (UFS) host configured to control a UFS device includes configuring a turbo write buffer of the UFS device; sending a first query request UFS protocol information unit (UPIU) including reconfiguration information about the turbo write buffer to the UFS device, during driving the UFS device; and receiving a first response UPIU associated with the first query request UPIU from the UFS device, wherein the first query request UPIU is a request that causes a size of the turbo write buffer of the UFS device to be changed from a first size to a second size different from the first size.

19 Claims, 20 Drawing Sheets

(56) References Cited

U.S. PATENT DOCUMENTS

| | | |
|---|---|---|
| 2020/0050366 A1 | 2/2020 | Bavishi et al. |
| 2020/0293221 A1* | 9/2020 | Jang ............... G06F 3/0604 |
| 2021/0034300 A1 | 2/2021 | Cho et al. |
| 2021/0064286 A1 | 3/2021 | Jung et al. |
| 2023/0143181 A1* | 5/2023 | Tan ................ G06F 3/0656 |
| | | 711/103 |
| 2024/0330172 A1* | 10/2024 | Tiku ............... G06F 3/0656 |

\* cited by examiner

OPERATION METHOD OF UNIVERSAL FLASH STORAGE HOST AND OPERATION METHOD OF UNIVERSAL FLASH STORAGE SYSTEM

CROSS-REFERENCE TO RELATED APPLICATIONS

This application is a continuation of U.S. application Ser. No. 17/579,665, filed on Jan. 20, 2022 which claims priority under 35 U.S.C. § 119 to Korean Patent Application Nos. 10-2021-0016934 filed on Feb. 5, 2021 and 10-2021-0031915 filed on Mar. 11, 2021, in the Korean Intellectual Property Office, the disclosures of which are incorporated by reference herein in their entireties.

BACKGROUND

1. Field

At least some example embodiments relate to a semiconductor memory, and more particularly, relate to an operation method of a universal flash storage (UFS) host and an operation method of a UFS system.

2. Related Art

A semiconductor memory device is classified as a volatile memory device, in which stored data is lost when a power supply is interrupted, such as a static random access memory (SRAM) or a dynamic random access memory (DRAM), or a nonvolatile memory device, in which stored data are is even when a power supply is interrupted, such as a flash memory device, a phase-change RAM (PRAM), a magnetic RAM (MRAM), a resistive RAM (RRAM), or a ferroelectric RAM (FRAM).

The flash memory device is being widely used as a high-capacity storage medium in a computing device. Nowadays, various technologies for supporting a high-speed operation of the flash memory device are being developed. For example, a universal flash storage (UFS) interface defined by the JEDEC standard may support an operating speed higher than that of a conventional flash memory based storage device.

SUMMARY

At least some example embodiments provide an operation method of a UFS host having improved performance and an operation method of a UFS system.

An operation method of a universal flash storage (UFS) host configured to control a UFS device includes configuring a turbo write buffer of the UFS device; sending a first query request UFS protocol information unit (UPIU) including reconfiguration information about the turbo write buffer to the UFS device, during driving the UFS device; and receiving a first response UPIU associated with the first query request UPIU from the UFS device, wherein, the first query request UPIU is a request that causes a size of the turbo write buffer of the UFS device to be changed from a first size to a second size different from the first size.

According to at least one example embodiment, an operation method of a universal flash storage (UFS) host configured to control a UFS device includes configuring a turbo write buffer at the UFS device, and reconfiguring the turbo write buffer during driving the UFS device. Each of memory cells of a first physical storage space corresponding to the turbo write buffer from among physical storage spaces of the UFS device is configured to store N bits, a second physical storage space corresponding to user storage from among the physical storage spaces of the UFS device is configured to store M bits, the N is a natural number, and the M is a natural number more than the N.

According to at least one example embodiment, an operation method of a universal flash storage (UFS) system including a UFS device and a UFS host includes configuring, by the UFS host, a turbo write buffer of the UFS device, sending, by the UFS host, a write command and write data to the UFS device, writing, by the UFS device, the write data in the turbo write buffer and sending a response to the write command to the UFS host, flushing, by the UFS device, the write data stored in the turbo write buffer to user storage, and reconfiguring, by the UFS host, the turbo write buffer by changing at least one of a mode, a type, and a size of the turbo write buffer of the UFS device.

BRIEF DESCRIPTION OF THE FIGURES

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
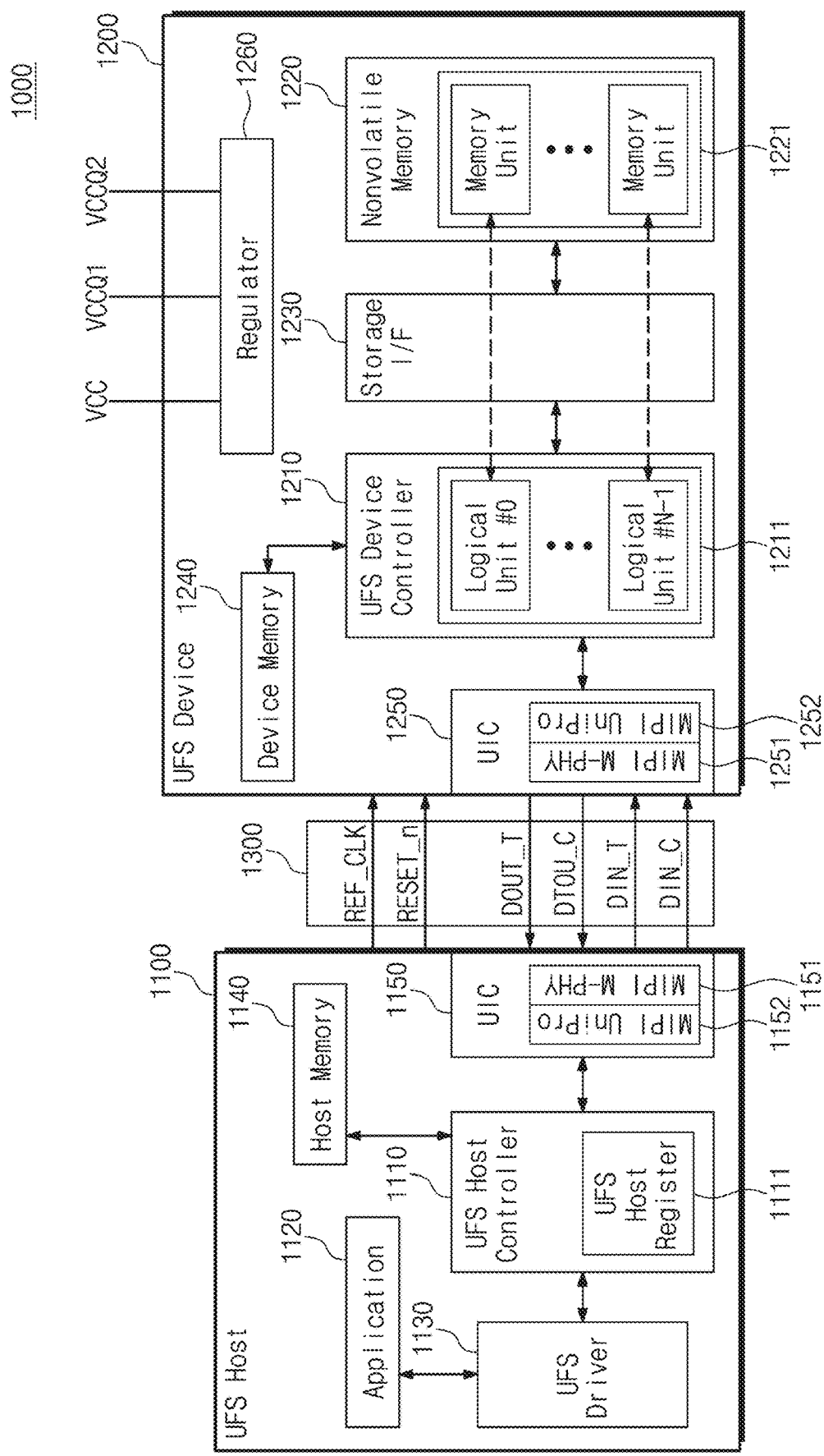
FIG. 1 is a block diagram illustrating a storage system according to at least one example embodiment.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram illustrating a storage system according to at least one example embodiment. Referring to FIG. 1, a storage system 1000 may be a UFS system that complies with a UFS standard announced by the JEDEC (Joint Electron Device Engineering Council). Accordingly, the storage system 1000 may also be referred to, in the present disclosure, as the UFS system 1000. Below, to describe embodiments of the present disclosure easily, it is assumed that the storage system 1000 is a UFS system complying with the UFS standard. However, at least some example embodiments are not limited thereto. For example, the storage system 1000 may include any other storage systems complying with various other standards or any other interface protocols. The storage system 1000 may include a UFS host 1100, a UFS device 1200, and a UFS interface 1300. The UFS host 1100 and the UFS device 1200 may be interconnected through the UFS interface 1300.

The UFS host 1100 may include a UFS host controller 1110, an application 1120, an UFS driver 1130, a host memory 1140, and an UFS interconnect (UIC) layer 1150. The UFS device 1200 may include a UFS device controller 1210, a nonvolatile memory 1220, a storage interface 1230, a device memory 1240, a UIC layer 1250, and a regulator 1260. The nonvolatile memory 1220 may include a plurality of memory units 1221. Each of the memory units 1221 may include a 2D NAND flash memory or a 3D V-NAND flash memory or may include another kind of nonvolatile memory such as a PRAM and/or an RRAM. The UFS device controller 1210 and the nonvolatile memory 1220 may be interconnected through the storage interface 1230. The storage interface 1230 may be implemented to comply with the standard such as Toggle or ONFI (Open NAND Flash Interface).

The application 1120 may indicate a variety of programs that are driven on the UFS host 1100. The application 1120 may mean a program that requires the communication with the UFS device 1200 to use functions of the UFS device 1200. For an input/output associated with the UFS device 1200, the application 1120 may send an input-output request IOR to the UFS driver 1130. The input-output request IOR may mean a data read request, a data write request, and/or a data discard (or unmap) request, not limited thereto.

The UFS driver 1130 may manage the UFS host controller 1110 through an UFS-HCI (Host Controller Interface). The UFS driver 1130 may convert an input-output request generated by the application 1120 to an UFS command defined by the UFS standard and may send the UFS command to the UFS host controller 1110. One input-output request may be converted to a plurality of UFS commands. A UFS command may be a command defined by the SCSI standard in general, but may be a command dedicated for the UFS standard or a UFS protocol information unit (e.g., a UFS protocol information unit (UPIU)) defined by the UFS standard.

The UFS host controller 1110 may be or include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. The processing circuitry of UFS host controller 1110 may be configured, via hardware and/or software (e.g., firmware), to perform and/or control any operation described in the specification as being performed by a UFS host controller, a UFS host (e.g., the UFS host 1100), or an element thereof. Further, the UFS host controller 1110 may also be referred to in the present specification as UFS host controller circuitry 1110.

The UFS host controller 1110 may send the UFS command converted by the UFS driver 1130 to the UIC layer 1250 of the UFS device 1200 through the UIC layer 1150 and the UFS interface 1300. In this process, an UFS host register 1111 of the UFS host controller 1110 may perform a role of a command queue (CQ).

The UIC layer 1150 of the UFS host 1100 may include an MIPI M-PHY 1151 and an MIPI UniPro 1152, and the UIC layer 1250 of the UFS device 1200 may also include an MIPI M-PHY 1251 and an MIPI UniPro 1252.

The UFS interface 1300 may include a clock signal line transferring a reference clock REF_CLK, a reset signal line transferring a hardware reset signal RESET_n for the UFS device 1200, a pair of input signal lines transferring a differential input signal pair DIN_T and DIN_C, and a pair of output signal lines transferring a differential output signal pair DOUT_T and DOUT_C.

A frequency value of the reference clock REF_CLK that is provided from the UFS host 1100 to the UFS device 1200 may be one of the following frequency values: 19.2 MHZ, 26 MHZ, 38.4 MHz, and 52 MHz. However, at least some example embodiments are not limited thereto. The UFS host 1100 may change a frequency value of the reference clock REF_CLK even in operation, that is, even while data are exchanged between the UFS host 1100 and the UFS device 1200. The UFS device 1200 may generate clocks of various frequencies from the reference clock REF_CLK provided from the UFS host 1100, by using a phase-locked loop (PLL) or the like. Also, the UFS host 1100 may set a value of a data rate between the UFS host 1100 and the UFS device 1200 through a frequency value of the reference clock REF_CLK. That is, a value of the data rate may be determined depending on a frequency value of the reference clock REF_CLK.

The UFS interface 1300 may support multiple lanes, and each lane may be implemented with a differential pair. For example, the UFS interface 1300 may include one or more receive lanes and one or more transmit lanes. In FIG. 1, a pair of lines transferring the differential input signal pair DIN_T and DIN_C may constitute a receive lane, and a pair of lines transferring the differential output signal pair DOUT_T and DOUT_C may constitute a transmit lane. One transmit lane and one receive lane are illustrated in FIG. 1, but the number of transmit lanes and the number of receive lanes may be changed. According to at least one example embodiment, the receive lane or the differential input signal pair DIN_T and DIN_C may correspond to a downstream lane input, and the transmit lane or the differential output signal pair DOUT_T and DOUT_C may correspond to an upstream lane output.

The receive lane and the transmit lane may allow data transmission in a serial communication manner, and a structure in which the receive lane and the transmit lane are separated from each other makes it possible for the UFS host 1100 and the UFS device 1200 to communicate with each other in a full-duplex manner. That is, even while the UFS device 1200 receives data from the UFS host 1100 through the receive lane, the UFS device 1200 may transmit data to the UFS host 1100 through the transmit lane. Also, control data such as a command from the UFS host 1100 to the UFS device 1200, and user data that the UFS host 1100 intends to store in the nonvolatile memory 1220 of the UFS device 1200 or intends to read from the nonvolatile memory 1220 may be provided through the same lane. As such, in addition to one receive lane and one transmit lane, a separate lane for data transmission may not be further provided between the UFS host 1100 and the UFS device 1200.

The UFS device controller 1210 may be or include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. The processing circuitry of UFS device controller 1210 may be configured, via hardware and/or software (e.g., firmware), to perform and/or control any operation described in the specification as being performed by a UFS device controller, a UFS device (e.g., the UFS device 1200), or an element thereof. Further, the UFS device controller 1210 may also be referred to in the present specification as UFS device controller circuitry 1210.

The UFS device controller 1210 of the UFS device 1200 may control an overall operation of the UFS device 1200. The UFS device controller 1210 may manage the nonvolatile memory 1220 through a logical unit (LU) 1211 being a logical data storage unit. The number of LUs 1211 may be "8", not limited to. The UFS device controller 1210 may include a flash translation layer (FTL), and may translate a logical data address provided from the UFS host 1100, for example, a logical block address (LBA) into a physical data address, for example, a physical block address (PBA) by using address mapping information of the FTL. In the UFS system 1000, a logical block for storing user data may have a size of a given range. For example, a minimum size of a logical block may be set to 4 Kbyte.

When a command from the UFS host 1100 is input to the UFS device 1200 through the UIC layer 1250, the UFS device controller 1210 may perform an operation corresponding to the input command; when the operation is completed, the UFS device controller 1210 may send a complete response to the UFS host 1100.

According to at least one example embodiment, when the UFS host 1100 intends to store user data in the UFS device 1200, the UFS host 1100 may send a data write command to the UFS device 1200. When a ready-to-transfer (RTT) response is received from the UFS device 1200, the UFS host 1100 may send user data to the UFS device 1200. The UFS device controller 1210 may temporarily store the provided user data in the device memory 1240, and may store the user data temporarily stored in the device memory 1240 at a selected location of the nonvolatile memory 1220 based on the address mapping information of the FTL.

According to at least one example embodiment, when the UFS host 1100 intends to read user data stored in the UFS device 1200, the UFS host 1100 may send a data read command to the UFS device 1200. In response to the data read command, the UFS device controller 1210 may read user data from the nonvolatile memory 1220 and may temporarily store the read user data in the device memory 1240. In this read process, the UFS device controller 1210 may detect and correct an error of the read user data by using an embedded error correction code (ECC) engine (not illustrated). In more detail, the ECC engine may generate parity bits for write data to be written in the nonvolatile memory 1220, and the parity bits thus generated may be stored in the nonvolatile memory 1220 together with the write data. When data are read from the nonvolatile memory 1220, the ECC engine may correct an error of the read data by using parity bits read from the nonvolatile memory 1220 together with the read data and may output the error-corrected read data.

The UFS device controller 1210 may send the user data temporarily stored in the device memory 1240 to the UFS host 1100. The UFS device controller 1210 may further include an advanced encryption standard (AES) engine (not illustrated). The AES engine may perform at least one of an encryption operation and a decryption operation on data input to the UFS device controller 1210 by using a symmetric-key algorithm.

According to at least one example embodiment, the communication between the UFS host 1100 and the UFS device 1200 may be performed based on a UFS protocol information unit (UPIU).

The UFS host 1100 may store command to be transferred to the UFS device 1200 in the UFS host register 1111, which is capable of functioning as a command queue, depending on an order and may send the commands to the UFS device 1200 depending on the order. In this case, even while the previous command is still being processed by the UFS device 1200, that is, even before the notification indicating that the previous command is completely processed by the UFS device 1200 is received, the UFS host 1100 may send a next command pending in the command queue to the UFS device 1200, and the UFS device 1200 may also receive the next command from the UFS host 1100 even while processing the previous command. The maximum number of commands capable of being stored in the command queue, that is, a depth of the command queue may be, for example, 32. Also, the command queue may be implemented in a type of a circular queue indicating a start and an end of commands enqueued therein through a head pointer and a tail pointer, respectively.

Each of the plurality of memory units 1221 may include a memory cell array (not illustrated) and a control circuit (not illustrated) controlling an operation of the memory cell array. The memory cell array may include a two-dimensional memory cell array or a three-dimensional memory cell array. The memory cell array may include a plurality of memory cells, and each memory cell may be a single level cell (SLC) storing 1-bit information or may be a cell storing information of two or more bits, such as a multi-level cell (MLC), a triple level cell (TLC), or a quadruple level cell (QLC). The three-dimensional memory cell array may include a vertical NAND string vertically oriented such that at least one memory cell is disposed above another memory cell.

As a power supply voltage, VCC, VCCQ1, VCCQ2, etc. may be input to the UFS device 1200. The power supply voltage VCC that is a main power supply voltage of the UFS device 1200 may have a value of 2.4 to 3.6 V. The power supply voltage VCCQ1 that is a power supply voltage for supplying a voltage of a low range may be mainly for the UFS device controller 1210 and may have a value of 1.14 to 1.26 V. The power supply voltage VCCQ2 that is a power supply voltage for supplying a voltage of a range lower than the power supply voltage VCC and higher than the power supply voltage VCCQ1 may mainly be for an input/output interface such as the MIPI M-PHY 1251 and may have a value of 1.7 to 1.95 V. The power supply voltages VCC, VCCQ1, and VCCQ2 may be supplied to respective components of the UFS device 1200 through the regulator 1260. The regulator 1260 may be implemented with a set of unit regulators, which are respectively connected with the above power supply voltages VCC, VCCQ1, and VCCQ2 (i.e., the unit regulators may be connected with different power supply voltages, respectively).

The UFS device 1200 may support a turbo write function, and the turbo write function may be enabled or disabled under control of the UFS host 1100. When the turbo write function is enabled under control of the UFS host 1100, the UFS device 1200 may perform a turbo write operation. The turbo write operation may be performed based on an SLC buffering scheme or various schemes supporting a fast write speed, and may provide improved performance (in particular, improved write performance) of the UFS device 1200. The turbo write operation will be more fully described with reference to the following drawings.

Below, for convenience of description, the expressions "turbo write function", "turbo write buffer", etc. may be used. However, the turbo write function may be referred to as various names such as SLC caching (or pseudo-SLC caching) and a write booster having a similar operation scheme, and the turbo write buffer may be referred to as various names such as a nonvolatile SLC cache and an SLC buffer configured to support the turbo write function.

Figure 2:
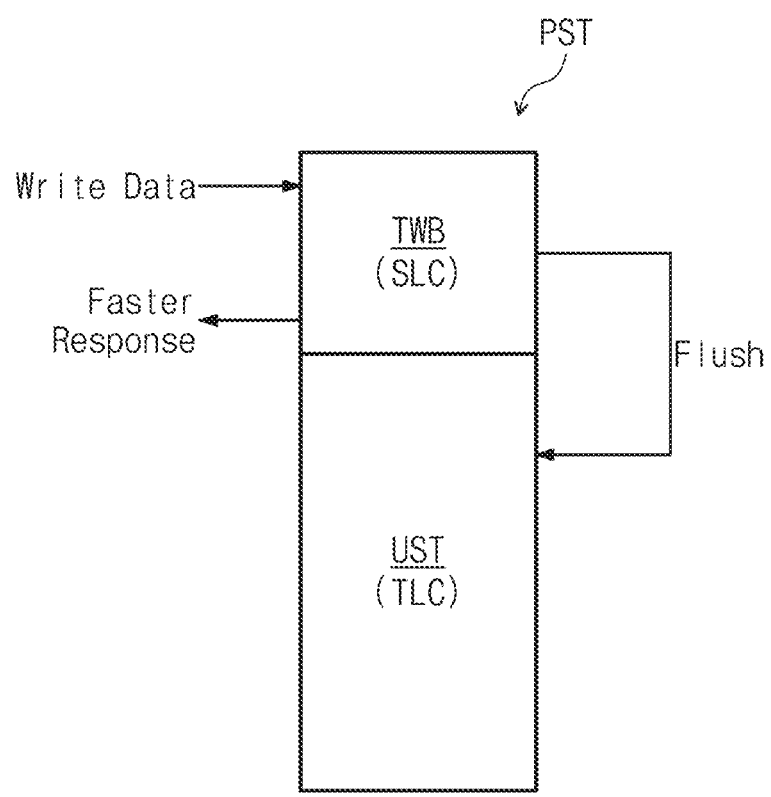
FIG. 2 is a diagram illustrating a physical storage space of a UFS device of FIG. 1.

FIG. 2 is a diagram illustrating a physical storage space of a UFS device of FIG. 1. According to at least one example embodiment, a physical storage space PST of the UFS device 1200 may indicate a physical area of the nonvolatile memory 1220, in which data are actually stored. That is, the physical storage space PST may mean a space capable of being identified by the UFS host 1100 as a capacity of the UFS device 1200 and a space capable of being used by an internal operation of the UFS device 1200.

According to at least one example embodiment, the UFS device 1200 may further include any other storage space (e.g., a space not identified by the UFS host 1100 as a capacity of the UFS device 1200, such as a reserved area, a meta area for storing meta data, or an overprovisioning area for improving performance), as well as the physical storage space PST illustrated in FIG. 2. However, for convenience of description, additional description associated with the other storage space will be omitted (or reduced and/or minimized), and embodiments of the present disclosure will be described with reference to the physical storage space PST where user data are stored.

Referring to FIGS. 1 and 2, the physical storage space PST of the UFS device 1200 may include a turbo write buffer area TWB (for convenience of description, hereinafter referred to as a "turbo write buffer") and a user storage area UST (for convenience of description, hereinafter referred to as a "user storage").

The turbo write buffer TWB may correspond to a portion of the physical storage space PST of the nonvolatile memory 1220 in the UFS device 1200. The user storage UST may correspond to the remaining portion of the physical storage space PST of the nonvolatile memory 1220 in the UFS device 1200 or may correspond to the whole physical storage space PST of the nonvolatile memory 1220.

According to at least one example embodiment, each of memory cells corresponding to the turbo write buffer TWB may be used as a single level cell (SLC), and each of memory cells corresponding to the user storage UST may be used as a triple level cell (TLC). Alternatively, each of the memory cells corresponding to the turbo write buffer TWB may be configured to store n-bit data (n being a positive integer), and each of the memory cells corresponding to the user storage UST may be configured to store m-bit data (m being a positive integer greater than n). In general, as the number of bits to be stored per memory cell decreases, a program speed or a write speed may become higher. That is, the turbo write buffer TWB may indicate an area supporting a write speed higher than that of the user storage UST.

According to at least one example embodiment, a ratio of the number of memory blocks or memory cells of a first area (i.e., corresponding to the turbo write buffer TWB) of the physical storage space PST of the UFS device 1200 and the number of memory blocks or memory cells of a second area (i.e., corresponding to the user storage UST) of the physical storage space PST of the UFS device 1200 may be determined depending on a capacity and an implementation way (e.g., SLC, MLC, TLC, and QLC) of the turbo write buffer TWB and the user storage UST. According to at least one example embodiment, as will be described below, a capacity and an implementation way of the turbo write buffer TWB and the user storage UST may be set through device attributes or a device descriptor.

According to at least one example embodiment, the UFS device 1200 may support a normal write function and a turbo write function. When the turbo write function is enabled by the UFS host 1100, the UFS device 1200 may perform the turbo write operation. When the turbo write function is disabled by the UFS host 1100, the UFS device 1200 may perform the normal write operation.

For example, in the case where the turbo write function is enabled, the UFS device 1200 may first write the write data received from the UFS host 1100 in the turbo write buffer TWB. In this case, because the write data received from the UFS host 1100 are written in the turbo write buffer TWB (e.g., are SLC programmed therein), a fast operating speed may be secured compared to the case where the normal write operation (e.g., TLC programming) is performed on the user storage UST. As such, the UFS device 1200 may send a faster response to the UFS host 1100.

In the case where the turbo write function is disabled, the UFS device 1200 may not first write the write data in the turbo write buffer TWB. Depending on an internally given policy (e.g., a normal write policy), the UFS device 1200 may directly write the write data in the user storage UST or may write the write data in the turbo write buffer TWB. How to write the write data may be determined based on various factors, such as the data share of the turbo write buffer TWB and a status of the physical storage space PST, depending on the normal write policy.

According to at least one example embodiment, the normal write policy may be defined to first write the write data in the user storage UST. For ease of description, it is assumed that the normal write policy is defined such that write data are preferentially written in the user storage UST.

However, at least some example embodiments of the inventive concepts are not limited thereto. According to at least one example embodiment, data written in the turbo write buffer TWB may be flushed or migrated to the user storage UST depending on an explicit command from the UFS host 1100 or an internally given policy.

According to at least one example embodiment, the UFS host 1100 may allow or prohibit a flush operation of the UFS device 1200 by setting a value of a turbo write buffer flush enable field (e.g., "fTurboWriteBufferFlushEn") of a FLAG of the UFS device 1200. The UFS device 1200 may start the flush operation based on a value of the turbo write buffer flush enable field of the FLAG. According to at least one example embodiment, that a value of the turbo write buffer flush enable field of the FLAG is "0b" may indicate disable or prohibition of the flush operation, and that a value of the turbo write buffer flush enable field of the FLAG is "1b" may indicate enable of the first flush operation. In the case where the flush operation is deactivated, the UFS device 1200 may not perform a separate flush operation.

According to at least one example embodiment, even though the user data written in the turbo write buffer TWB are flushed to the user storage UST, a logical address of the flushed user data may be maintained, and a physical address thereof may be changed. In this case, the UFS device 1200 may update mapping information of the logical address and the physical address of the flushed user data. For example, the physical address may be changed from an address of the turbo write buffer TWB to an address of the user storage UST.

According to at least one example embodiment, the UFS host 1100 may allow or prohibit a flush operation during a hibernate state of the UFS device 1200, by setting a value of a turbo write buffer flush enable field during hibernate state (e.g., "fTurboWriteBufferFlushDuringHibernat") of the FLAG of the UFS device 1200. The UFS device 1200 may determine whether the flush operation during the hibernate state is activated, based on the value of the turbo write buffer flush enable field during hibernate state of the FLAG. According to at least one example embodiment, that a value of the turbo write buffer flush enable field during hibernate state of the FLAG is "0b" may indicate disable or prohibition of the flush operation during the hibernate state. That a value of the turbo write buffer flush enable field during hibernate state of the FLAG is "1b" may indicate enable of the flush operation during the hibernate state. In the case where the flush operation during the hibernate state is deactivated, the UFS device 1200 may not perform a separate flush operation.

According to the above flush operation, user data written in the turbo write buffer TWB may be flushed or migrated to the user storage UST. As such, an available buffer size of the turbo write buffer TWB may be secured.

Figure 3:
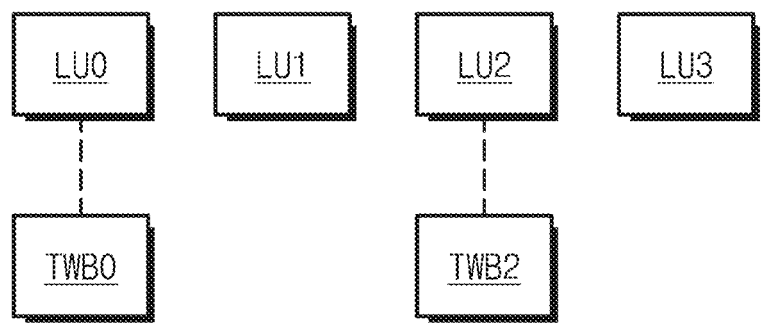
FIGS. 3 and 4 are diagrams for describing a configuration type of a turbo write buffer of FIG. 2.
Figure 4:
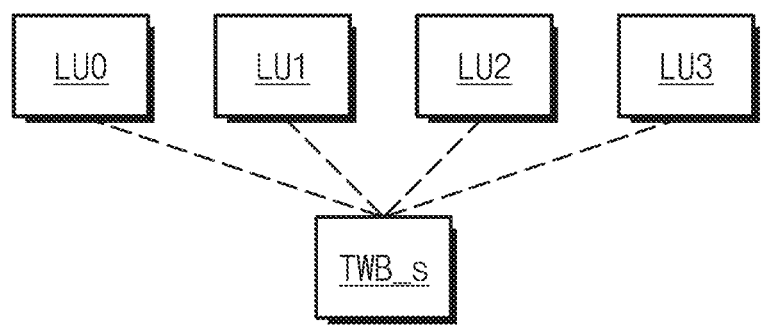

FIGS. 3 and 4 are diagrams for describing a configuration type of a turbo write buffer of FIG. 2. Referring to FIGS. 1 to 4, the UFS device 1200 may include 0-th to third logical units LU0 to LU3. Each of the 0-th to third logical units LU0 to LU3 may indicate a processing object that processes a command from the UFS host 1100, is externally managed, and is independent. The UFS host 1100 may manage a storage space of the UFS device 1200 through the 0-th to third logical units LU0 to LU3. Each of the 0-th to third logical units LU0 to LU3 may be used to store user data at the UFS device 1200.

Each of the 0-th to third logical units LU0 to LU3 may be associated with at least one memory block of the nonvolatile memory 1220. There may exist various kinds of logical units used for various purposes. However, it is assumed that the 0-th to third logical units LU0 to LU3 correspond to the physical storage space PST and are used to store data corresponding to a request of the UFS host 1100.

The 0-th to third logical units LU0 to LU3 are illustrated in FIGS. 3 and 4, but at least some example embodiments are not limited thereto. For example, the UFS device 1200 may further include additional logical units for storing and managing user data, as well as the 0-th to third logical units LU0 to LU3. Alternatively, the UFS device 1200 may further include other logical units for supporting various functions, as well as the 0-th to third logical units LU0 to LU3.

The turbo write buffer TWB of the UFS device 1200 according to at least one example embodiment may be configured in various types. The turbo write buffer TWB may be configured in one of a logical unit (LU) dedicated buffer type and a shared buffer type.

In the case of the LU dedicated buffer type, the turbo write buffer TWB may be independently or individually implemented for each logical unit LU. For example, as illustrated in FIG. 3, in the LU dedicated buffer type, a 0-th turbo write buffer TWB0 may be implemented to correspond to the 0-th logical unit LU0 of the 0-th to third logical units LU0 to LU3, and a second turbo write buffer TWB2 may be implemented to correspond to the second logical unit LU2 thereof.

In the above LU dedicated buffer type, in the case where a write command for the 0-th logical unit LU0 is received after the turbo write function is enabled, the write data may be first written in the 0-th turbo write buffer TWB0 corresponding to the 0-th logical unit LU0. In the case where a write command for the second logical unit LU2 is received after the turbo write function is enabled, the write data may be first written in the second turbo write buffer TWB2 corresponding to the second logical unit LU2.

In the case where there are received write commands for the first and third logical units LU1 and LU3 to which the turbo write buffer TWB is not allocated, the write data may be written in the user storage UST corresponding to the first and third logical units LU1 and LU3. Also, in the case where write commands for the 0-th and second logical units LU0 and LU2 are received after the turbo write function is disabled, depending on the normal write policy, the write data may be written in the turbo write buffers TWB0 and TWB2 or may be written in the user storage UST corresponding to the 0-th and second logical units LU0 and LU2 instead of a turbo write buffer.

According to at least one example embodiment, capacities of the 0-th and second turbo write buffers TWB0 and TWB2 may be set independently of each other. However, at least some example embodiments are not limited thereto. For example, the number of logical units to which turbo write buffers are respectively allocated, a capacity of each turbo write buffer, etc. may be variously changed or modified.

According to at least one example embodiment, a size of the turbo write buffer TWB for each logical unit may be set at a turbo write buffer allocation number field per unit (e.g., "dLUNumTurboWriteBufferAllocUnits") of a unit descriptor. According to at least one example embodiment, the turbo buffer write number allocation field per unit (e.g., "dLUNumTurboWriteBufferAllocUnits") may be a parameter configurable by the UFS host 1100.

In the case of the shared buffer type, one turbo write buffer may be implemented to correspond to all the logical units. For example, as illustrated in FIG. 4, in the shared buffer type, one shared turbo write buffer TWB_s may be implemented to correspond to all the 0-th to third logical units LU0 to LU3.

In this case, when a write command associated with each of the 0-th to third logical units LU0 to LU3 is received after the turbo write function is enabled, the write data may be first written in the shared turbo write buffer TWB_s. In the case where a write command associated with each of the 0-th to third logical units LU0 to LU3 is received after the turbo write function is disabled, depending on the normal write policy, the write data may be written in the shared turbo write buffer TWB_s or may be written in the user storage UST corresponding to the 0-th and third logical units LU0 and LU3.

According to at least one example embodiment, information about a size of the shared turbo write buffer TWB_s may be included in a shared turbo write buffer allocation unit number field (e.g., "dNumSharedTurboWriteBufferAllocUnits") of a device descriptor or a configuration descriptor of the UFS device 1200.

As described above, the UFS device 1200 according to at least one example embodiment may include the turbo write buffer TWB for supporting the turbo write function. Depending on a butter type (e.g., the LU dedicated buffer type or the shared buffer type), the turbo write buffer TWB may be independently implemented to correspond to each of a plurality of logical units, or one turbo write buffer TWB may be implemented to correspond to all the logical units.

According to at least one example embodiment, the UFS device 1200 may provide information (e.g., a logical unit dedicated buffer type, a shared buffer type, or all thereof) about a turbo write buffer type capable of being supported by the UFS device 1200, through a supported turbo write buffer type field (e.g., "bSupportedTurboWriteBufferTypes") of a geometry descriptor.

Figure 5:
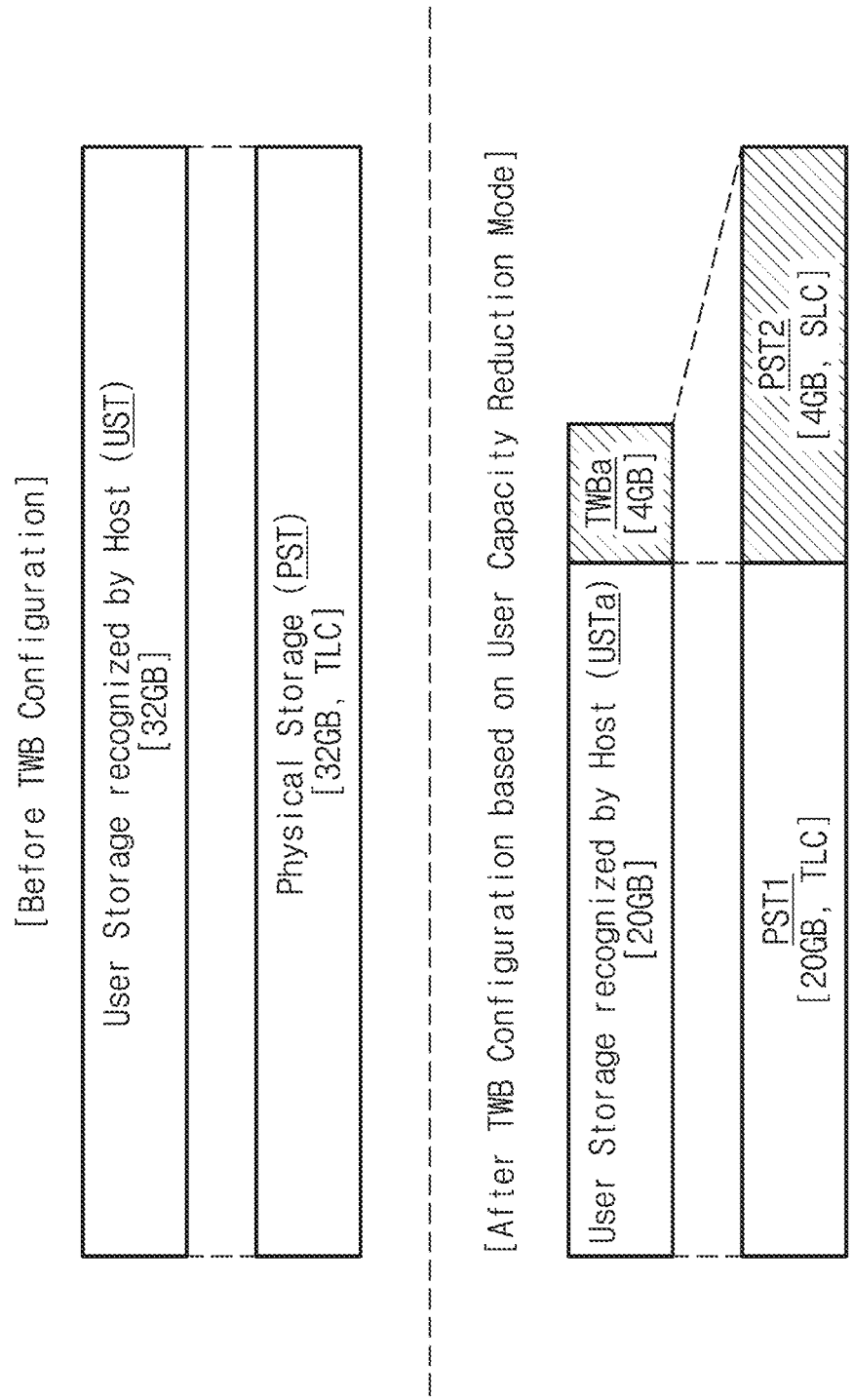
FIGS. 5 to 7 are diagrams for describing modes to configure a turbo write buffer of a UFS device of FIG. 1.
Figure 6:
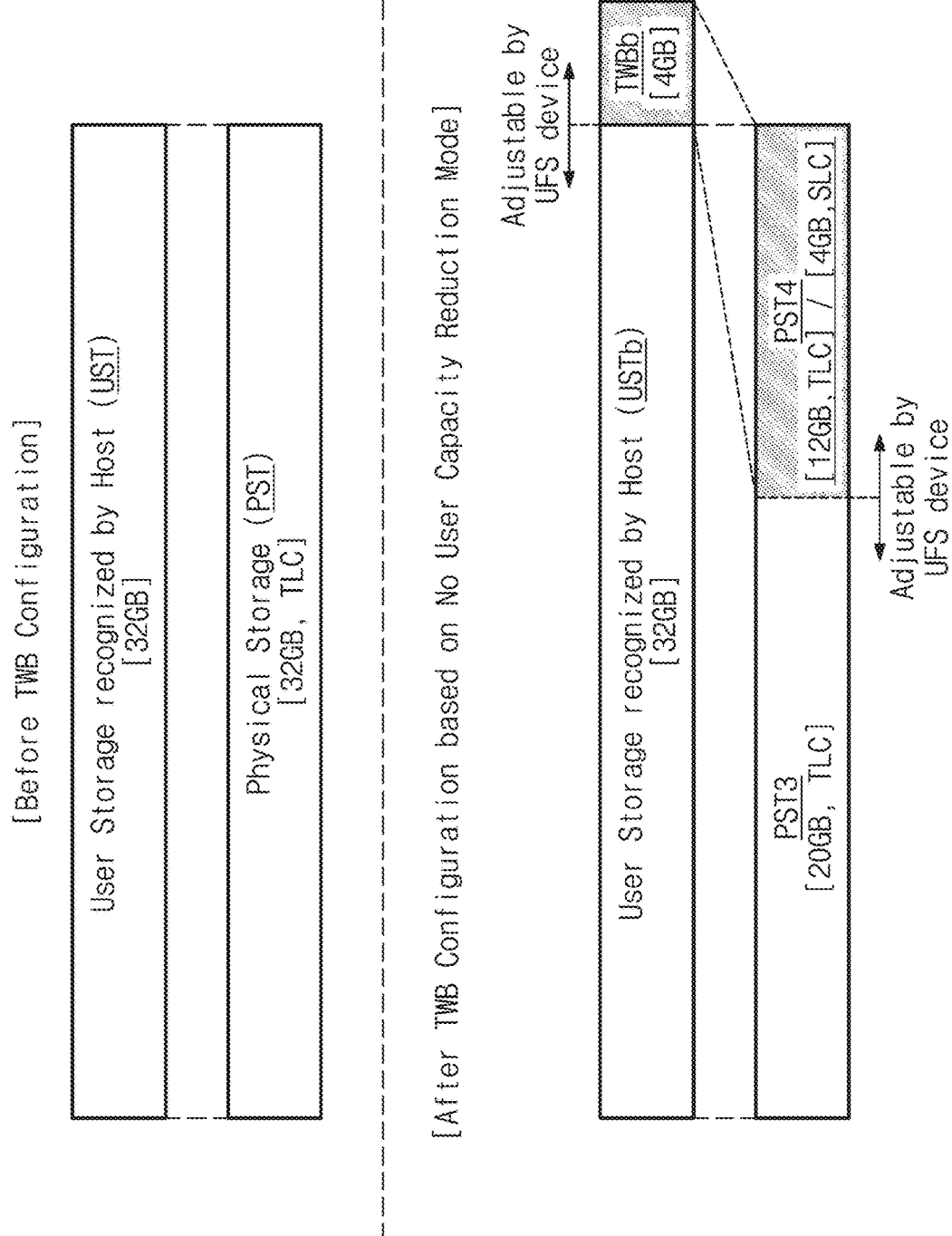
Figure 7:
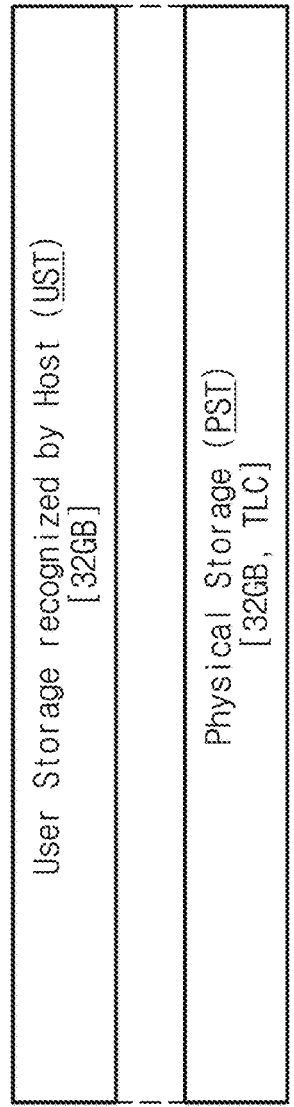
Figure 7:
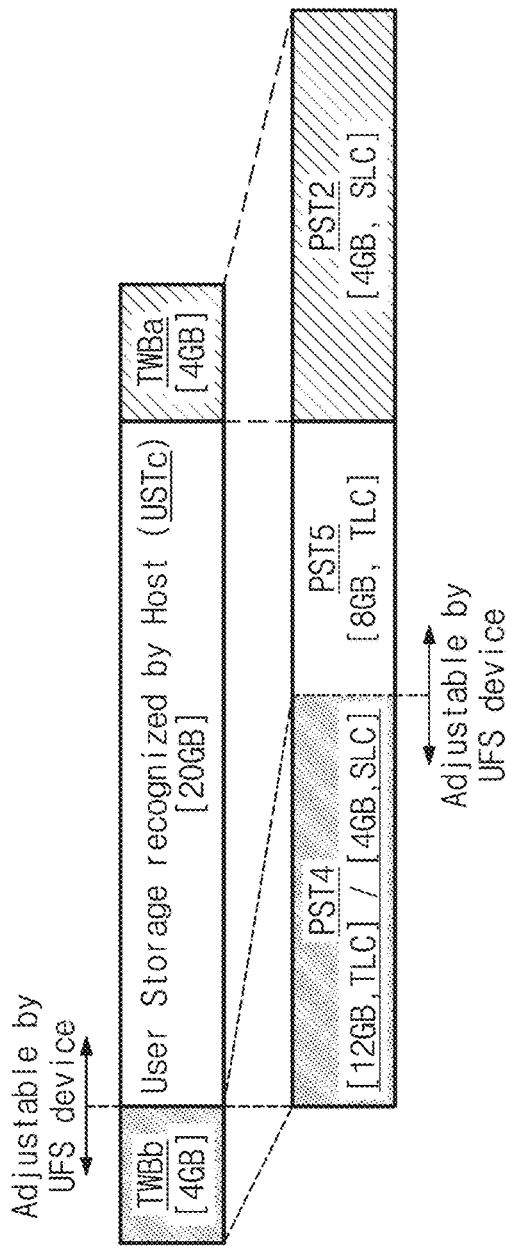

FIGS. 5 to 7 are diagrams for describing modes to configure a turbo write buffer of a UFS device of FIG. 1. Below, for convenience of description, it is assumed that the physical storage space PST of the UFS device 1200 is 32 GB on the basis of the TLC. That is, in the case where each of memory cells included in the UFS device 1200 stores 3-bit data, the UFS device 1200 may store user data of 32 GB. However, at least some example embodiments are not limited thereto. For example, the physical storage space PST of the UFS device 1200 may be variously changed depending on a scheme to implement the UFS device 1200 or the nonvolatile memory 1220, for example, depending on a memory cell type (e.g., SLC, MLC, TLC, or QLC), the number of memory cells, a memory cell structure, an overprovisioning ratio, etc.

According to at least one example embodiment, the UFS device 1200 may support three turbo write buffer modes such as a user capacity reduction mode, a no user capacity reduction mode, and a partial-reduction mode. However, at least some example embodiments are not limited thereto. For example, the UFS device 1200 may support various modes that are not disclosed explicitly in the detailed description.

First, referring to FIGS. 1 and 5, the UFS device 1200 may configure the turbo write buffer TWB based on a user capacity reduction mode under control of the UFS host 1100. The user capacity reduction mode may indicate a mode to reduce a user capacity of the user storage UST to configure a turbo write buffer TWBa.

For example, as illustrated in FIG. 5, the physical storage space PST of the UFS device 1200 may be 32 GB on the basis of the TLC. Before the turbo write buffer TWB is configured, the capacity of 32 GB (i.e., all the capacity of the physical storage space PST) may be allocated to the user storage UST or may be used for the user storage UST. In this case, the user storage UST may be recognized to be the size of 32 GB from a point of view of the UFS host 1100.

The turbo write buffer TWB may be configured depending on the user capacity reduction mode. In this case, a second physical storage space PST2 being a portion of the physical storage space PST may be allocated to a turbo write buffer TWBa or may be used for the turbo write buffer TWBa. A first physical storage space PST1 being a portion of the physical storage space PST may be allocated to a user storage USTa or may be used for the user storage USTa. In this case, compared to the case where the turbo write buffer TWB is not configured, the capacity of the user storage USTa may decrease from a point of view of the UFS host 1100.

For example, after configuring the turbo write buffer, the first physical storage space PST1 corresponding to the user storage USTa may be implemented with the TLC, and the second physical storage space PST2 corresponding to the turbo write buffer TWBa may be implemented with the SLC. A ratio of a data storage capacity when the same storage space is used as a TLC space and a data storage capacity when the same storage space is used as an SLC space may be "3:1".

In other words, when the size of the turbo write buffer TWBa increases as much as 1 GB, a size of a logical storage space of the user storage USTa may decrease as much as 3 GB. As described above, in the case where the turbo write buffer TWBa of 4 GB is configured in the user capacity reduction mode, the second physical storage space PST2 being a portion of the physical storage space PST of the UFS device 1200 may be allocated for the turbo write buffer TWBa, and the first physical storage space PST1 being the remaining portion thereof may be allocated as the user storage USTa identified by the UFS host 1100. In this case, the first physical storage space PST1 may be 20 GB on the basis of the TLC, and the second physical storage space PST2 may be 4 GB on the basis of the SLC. Accordingly, the user storage USTa may be set to 20 GB.

According to at least one example embodiment, the first physical storage space PST1 corresponding to the user storage USTa and the second physical storage space PST2 corresponding to the turbo write buffer TWBa may be physically adjacent to each other or may be physically spaced from each other.

The no user capacity reduction mode may indicate a mode in which a logical storage capacity of the user storage USTb recognized by the host 1100 is not reduced even though a turbo write buffer TWBb is configured. For example, as illustrated in FIG. 6, before the configuration of the turbo write buffer TWB, the user storage UST may have the capacity of 32 GB. That is, the physical storage space PST of the UFS device 1200 may be allocated to the user storage UST or may be used for the user storage UST.

Next, referring to FIGS. 1 and 6, the UFS device 1200 may configure the turbo write buffer TWB based on the no user capacity reduction mode. The no user capacity reduction mode may indicate a mode in which a turbo write buffer is allocated without a decrease in a capacity of the user storage UST recognized by the UFS host 1100.

For example, as illustrated in FIG. 6, in the case where a turbo write buffer TWBb of 4 GB is configured based on the no user capacity reduction mode, a fourth physical storage space PST4 may be allocated for the turbo write buffer TWBb. The fourth physical storage space PST4 may be 12

GB on the basis of the TLC and may be 4 GB on the basis of the SLC. In this case, a third physical storage space PST3 being the remaining physical storage space may be 20 GB on the basis of the TLC. The UFS host 1100 may recognize both the third physical storage space PST3 and the fourth physical storage space PST4 as user storage USTb. That is, in the no user capacity reduction mode, the user storage USTb may maintain the capacity of 32 GB. In the no user capacity reduction mode, even though the turbo write buffer TWBb is configured, the capacity of the user storage UST identified from a point of view of the host 1100 may be identical to that before the configuration of the turbo write buffer TWBb.

According to at least one example embodiment, in the no user capacity reduction mode, a size or configuration of the turbo write buffer TWBb may be adjustable by an internal policy of the UFS device 1200. For example, because the fourth physical storage space PST4 being a portion of the physical storage space PST is used to configure the turbo write buffer TWBb, a capacity of the third physical storage space PST3 available for the user storage USTb may be smaller than a capacity of the user storage USTb.

That is, in the case where the whole third physical storage space PST3 is used to store user data or an available free capacity of the third physical storage space PST3 is equal to or smaller than a reference value, all or a portion of the fourth physical storage space PST4 used for the turbo write buffer TWBb may be returned to the user storage USTb.

In other words, in the third physical storage space PST3, in the case where it is impossible to maintain the turbo write buffer TWBb due to the lack of the available space for the user storage USTb, the fourth physical storage space PST4 allocated for the turbo write buffer TWBb may be returned to the user storage USTb. In this case, a size of the fourth physical storage space PST4 may decrease, and a size of the third physical storage space PST3 may increase. The above return operation may be performed, for example, through a user data flush operation and a turbo write buffer size setting operation.

According to at least one example embodiment, the UFS device 1200 may automatically return a physical storage space used for the turbo write buffer TWB to the user storage UST. The UFS host 1100 may check a change status of the turbo write buffer TWB based on a current turbo write buffer size field.

Then, referring to FIGS. 1 and 7, the UFS device 1200 may configure the turbo write buffer TWB based on the partial-reduction mode. According to at least one example embodiment, the partial-reduction mode may be a mode corresponding to a combination of the user capacity reduction mode and the no user capacity reduction mode described with reference to FIGS. 5 and 6. For example, in the case where a turbo write buffer is configured according to the partial-reduction mode, the second physical storage space PST2 of the physical storage space PST of the UFS device 1200 may be allocated for the turbo write buffer TWBa, and the fourth physical storage space PST4 may be allocated for the turbo write buffer TWBb and a user storage USTc, and a fifth physical storage space PST5 may be allocated for the user storage USTc. That is, in the case where the turbo write buffer TWBa configured according to the user capacity reduction mode is 4 GB, the turbo write buffer TWBb configured according to the no user capacity reduction mode is 4 GB, and the user storage USTc is 20 GB, the second physical storage space PST2 of the physical storage space PST being 32 GB on the basis of the TLC may be 4 GB on the basis of the SLC, the fourth physical storage space PST4 may be 4 GB on the basis of the SLC and 12 GB on the basis of the TLC, and the fifth physical storage space PST5 may be 8 GB on the basis of the TLC. According to at least one example embodiment, as described with reference to FIG. 6, a size of the fourth physical storage space PST4 may be adjustable by an operation of the UFS device 1200.

As described above, the UFS device 1200 may configure the turbo write buffer TWB based on various modes. In this case, the turbo write buffer TWBa configured according to the user capacity reduction mode may have a fixed size. That is, a capacity of the user storage UST may be reduced by the turbo write buffer TWBa configured according to the user capacity reduction mode. On the other hand, in the case where the turbo write buffer TWBb is configured according to the no user capacity reduction mode, there may be no change of a capacity of the user storage UST recognized by the UFS host 1100. However, because a partial physical storage space is allocated for the turbo write buffer TWBb, an overhead (e.g., a flush operation or a migration operation) for returning the turbo write buffer TWBb to the user storage UST may occur. That is, as the turbo write buffer TWB is configured, a capacity of user storage may be reduced, or an overhead may occur due to returning a physical storage space.

According to at least one example embodiment, in the case where the turbo write buffer TWB is configured, a size of the turbo write buffer TWB may be set at fields of various descriptors of the UFS device 1200. For example, in the case where the turbo write buffer TWB is configured in the LU dedicated buffer type, information about a size of the turbo write buffer TWB for each logical unit may be set at a turbo write buffer allocation number field per logical unit (e.g., "dLUNumTurboWriteBuffErAllocUnit") of a unit descriptor. Alternatively, in the case where the turbo write buffer TWB is configured in the shared buffer type, information about a size of the turbo write buffer TWB may be set at a shared turbo write buffer allocation unit number field (e.g., "dNumSharedTurboWriteBufferAllocUnits") of a device descriptor or a configuration descriptor.

According to at least one example embodiment, fields associated with a size, a mode, or a type of the turbo write buffer TWB including the above fields may be determined in a manufacturing phase or an initialization phase of the UFS device 1200, and may not be changed during driving the UFS device 1200.

According to at least one example embodiment, the UFS host 1100 may be configured to reconfigure the turbo write buffer TWB during driving the UFS device 1200. For example, the UFS host 1100 may be configured to reconfigure a size, a type, or a mode of the turbo write buffer TWB based on a use pattern (e.g., the utilization of a user storage, the utilization of a turbo write buffer, or an available turbo write buffer size) of the UFS device 1200. Accordingly, because an actual physical storage space for the user storage UST in the UFS device 1200 may be secured, the performance of the UFS device 1200 may be improved.

Figure 8:
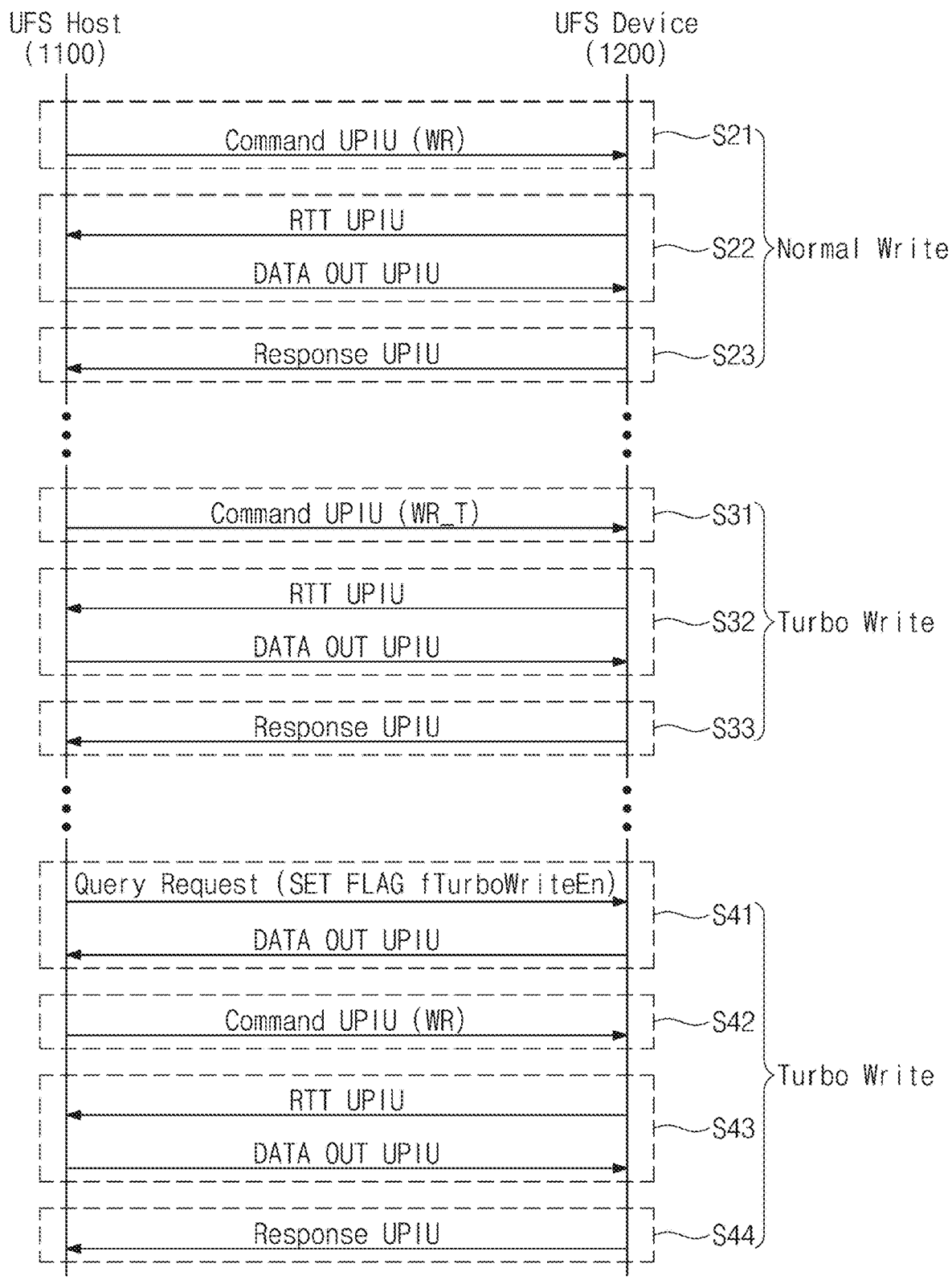
FIG. 8 is a flowchart illustrating an operation of a UFS system of FIG. 1.

FIG. 8 is a flowchart illustrating an operation of a UFS system of FIG. 1. For convenience of description, components that are unnecessary to describe a normal write operation and a turbo write operation for the UFS device 1200 are omitted. Also, unless otherwise defined, the turbo write buffer TWB may be configured according to one of various types and modes of the turbo write buffer TWB described above, and the turbo write operation may indicate an operation of preferentially writing write data in the turbo write buffer TWB thus configured.

Referring to FIGS. 1, 2, and 8, in operation S21, the UFS host 1100 may send a command UPIU including a write command WR to the UFS device 1200. In operation S22, the UFS device 1200 may send a READY TO TRANSFER (RTT) UPIU to the UFS host 1100 in response to the write command WR, and the UFS host 1100 may send a DATA OUT UPIU to the UFS device 1200 in response to the RTT UPIU. According to at least one example embodiment, operation S22 may be repeatedly performed until all write data corresponding to the write command WR in operation S21 are received.

After all the write data are completely received, in operation S23, the UFS device 1200 may send a RESPONSE UPIU to the UFS host 1100. The RESPONSE UPIU may include information indicating that an operation corresponding to the write command WR received in operation S21 is completed.

According to at least one example embodiment, when a value of the turbo write enable field is not set or when the write command WR does not include information about the turbo write function, the write data received from the UFS host 1100 in operation S22 may be written in the turbo write buffer TWB or the user storage UST depending on the normal write policy.

According to at least one example embodiment, the turbo write function may be set or performed in various schemes. Below, a scheme in which the UFS device 1200 performs the turbo write operation will be described through operation S31 to operation S33 or operation S41 or operation S44.

In operation S31, the UFS host 1100 may send the command UPIU including a turbo write command WR_T to the UFS device 1200. Afterwards, the UFS host 1100 and the UFS device 1200 may perform operation S32 and operation S33. Operation S32 and operation S33 are similar to operation S22 and operation S23, and thus, additional description will be omitted to avoid redundancy.

According to at least one example embodiment, the UFS device 1200 may perform the turbo write operation on the write data received in operation S32 in response to the turbo write command WR_T in operation S31. For example, the turbo write command WR_T may have a format similar to that of the write command WR in operation S21, but may include information about the turbo write function. According to at least one example embodiment, the information about the turbo write function may be set through a GROUP NUMBER of the command UPIU. That is, by setting a specific value (e.g., "10001b") to the GROUP NUMBER of the command UPIU including a write command, the UFS host 1100 may send the turbo write command WR_T to the UFS device 1200, and the UFS device 1200 may perform the turbo write operation in response to the turbo write command WR_T.

According to at least one example embodiment, the enable of the turbo write function through the GROUP NUMBER of the write command may be implemented by setting a turbo write group number field (e.g., "bTurboWriteGroupNumberCap") of a geometry descriptor of the UFS device 1200. For example, in the case where "00h" is set to the turbo write group number field, even though a write command includes a group number of "10001b", the write command may not be managed as a turbo write command: in the case where "01h" is set to the turbo write group number field, a write command including a group number of "10001b" may be processed as a turbo write command.

Next, in operation S41, the UFS host 1100 may set a specific value (e.g., "1b") to the turbo write enable field. For example, the UFS host 1100 may send a query request for setting a value of the turbo write enable field with a specific value (e.g., "1b") to the UFS device 1200. A value of the turbo write enable field may be set with the specific value (e.g., "1b") in response to the query request from the UFS host 1100, and the UFS device 1200 may transfer a query response to the UFS host 1100.

According to at least one example embodiment, the UFS device 1200 may determine whether the turbo write function is enabled, by checking a value of the turbo write enable field (e.g., "fTurboWriteEn") of the FLAG. In the case where the value of the turbo write enable field of the FLAG is "0b", the turbo write function may be in a disabled state: in the case where the value of the turbo write enable field is "1b", the turbo write function may be in an enabled state. According to at least one example embodiment, the value of the turbo write enable field of the FLAG may be set by the query request for a set flag of the UFS host 1100. The UFS device 1200 may perform the turbo write operation based on the value of the turbo write enable field of the FLAG.

For example, in operation S41, the UFS host 1100 may set a value of the turbo write enable field with a specific value (e.g., "1b"). For example, the UFS host 1100 may send the query request for setting the value of the turbo write enable field with a specific value (e.g., "1b") to the UFS device 1200. The value of the turbo write enable field may be set with the specific value (e.g., "1b") in response to the query request from the UFS host 1100, and the UFS device 1200 may transfer the query response to the UFS host 1100. Afterwards, the UFS host 1100 and the UFS device 1200 may perform operation S42 to operation S44. Operation S42 to operation S44 are similar to operation S21 to operation S23 or operation S31 to operation S33, and thus, additional description will be omitted to avoid redundancy.

As described above, the UFS host 1100 may enable the turbo write function of the UFS device 1200 by setting a specific value to a specific field of a write command or a command UPIU, or setting a specific field (e.g., a turbo write enable field) of the FLAG of the UFS device 1200.

Figure 9:
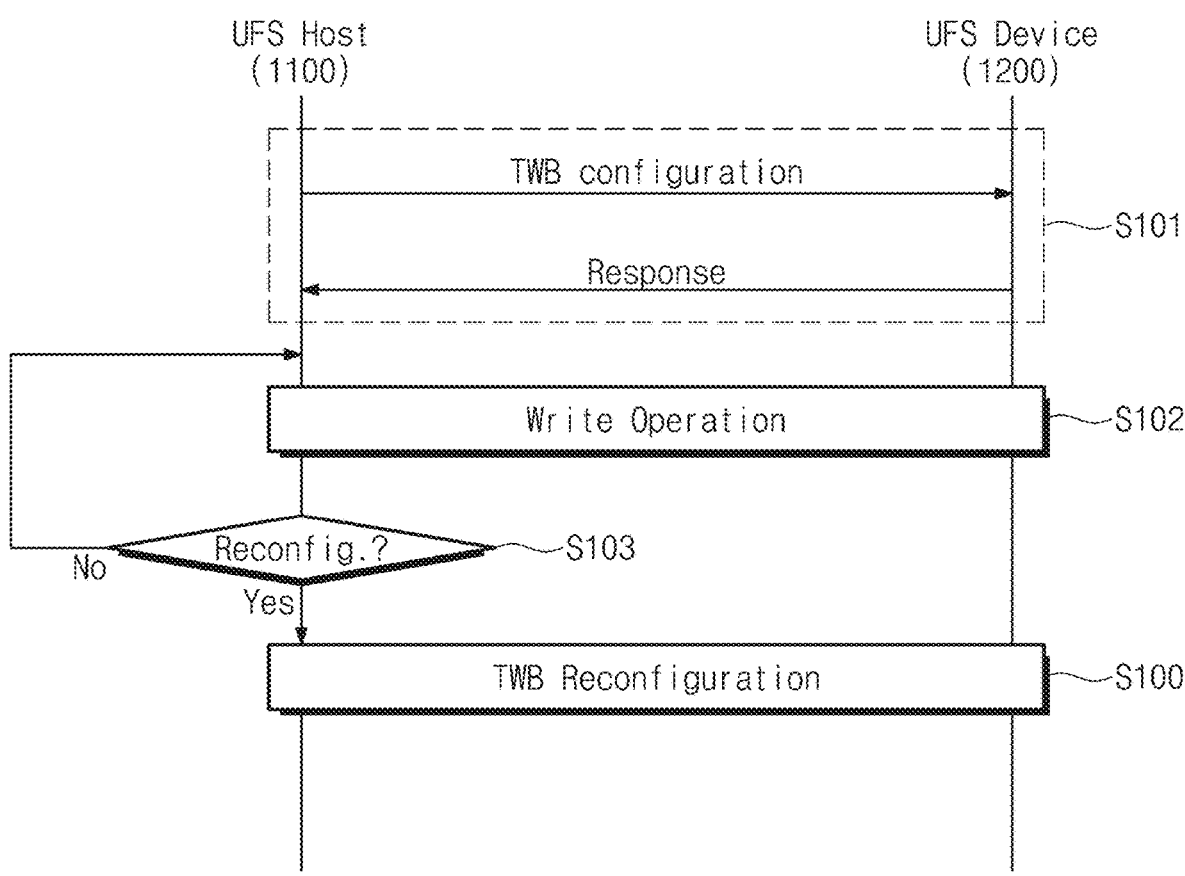
FIG. 9 is a flowchart illustrating an operation of a UFS system of FIG. 1.

FIG. 9 is a flowchart illustrating an operation of a UFS system of FIG. 1. Referring to FIGS. 1, 2, and 9, in operation S101, the UFS host 1100 may configure the turbo write buffer TWB of the UFS device 1200. For example, the UFS host 1100 may send a turbo write configuration request "TWB configuration" for setting various fields of the UFS device 1200 to the UFS device 1200, and the UFS device 1200 may send a response to the request to the UFS host 1100.

For brevity of drawing and convenience of description, operation S101 is briefly illustrated, but at least some example embodiments are not limited thereto. For example, the UFS host 1100 may check a configuration and a function of the UFS device 1200 through a device descriptor of the UFS device 1200. For example, the device descriptor may include an extended UFS function support field (e.g., "dExtendedUFSFeaturesSupport") including information about whether to support the turbo write function. According to at least one example embodiment, the information about whether to support the turbo write function may be set at a specific bit (e.g., bit[8]) of the extended UFS function support field.

The device descriptor may further include a turbo write buffer user space reduction type field (e.g., "bTurboWriteBufferUserSpaceReductionType") including information about a turbo write buffer mode. The turbo write buffer user space reduction type field may include information about a mode (i.e., a user space reduction mode, a no user space reduction mode, and a partial-reduction mode) of a turbo write buffer. According to at least one example embodiment, when the turbo write buffer user space reduction type field is "00h", a turbo write buffer is configured based on the user capacity reduction mode described with reference to FIG. 5; when the turbo write buffer user space reduction type field is "01h", a turbo write buffer is configured based on the no user capacity reduction mode described with reference to FIG. 6; and, when the turbo write buffer user space reduction type field is "02h", a turbo write buffer is configured based on the partial-reduction mode described with reference to FIG. 7. According to at least one example embodiment, in the case where a turbo write buffer is configured based on the user capacity reduction mode or the partial-reduction mode, because it is impossible to allocate the whole capacity of user storage due to the turbo write buffer, corresponding logical units may be configured through thin-provisioning (i.e., a field of "bProvisioningType" being "02h" or "03h").

The device descriptor may further include a turbo write buffer type field (e.g., "bTurbowriteBufferType") including information about a turbo write buffer type. In the case where "00h" is set to the turbo write buffer type field, the turbo write buffer TWB may be configured according to the LU dedicated buffer type described with reference to FIG. 3; in the case where "01h" is set to the turbo write buffer type field, the turbo write buffer TWB may be configured according to the shared buffer type described with reference to FIG. 4.

The device descriptor may further include a shared turbo write buffer allocation unit number field (e.g., "dNumSharedTurboWriteBufferAllocUnits") including information about a size of a turbo write buffer. In the case where the number of units allocated to a shared turbo write buffer is "0", a turbo write buffer of the shared buffer type may not be configured.

Each field described above is an example, and at least some example embodiments are not limited thereto. The device descriptor may further include other fields including information about a configuration, a structure, a function, etc. of the UFS device 1200, as well as the fields described above. Various fields of the device descriptor may include values that are set before the initialization operation. The UFS host 1100 may identify a current status of the UFS device 1200 by reading various fields of the device descriptor.

According to at least one example embodiment, in the case where a turbo write buffer is configured in the LU dedicated buffer type, a size of a turbo write buffer for each logical unit may be set through an allocated turbo write buffer number field per logical unit (e.g., "dLUNumTurboWriteBufferAllocUnits") of a unit descriptor.

According to at least one example embodiment, the above fields (e.g., "bTurboWriteBufferUserSpaceReductionType", "bTurboWriteBufferType", "dNumSharedTurboWriteBufferAllocUnits", and "dLUNumTurboWriteBufferAllocUnits") may be changed by writing a given value in a corresponding field of a configuration descriptor. That is, the UFS host 1100 may change information such as a turbo write buffer type, a turbo write buffer no user space reduction enable, and the number of units allocated to a turbo write buffer, by writing values of various fields of the configuration descriptor.

According to at least one example embodiment, the geometry descriptor of the UFS device 1200 may include information about the UFS device 1200, such as a turbo write buffer maximum size field, a turbo write buffer maximum number field, a turbo write buffer capacity adjustment factor field, a supported turbo write buffer no user capacity reduction type field, and a supported turbo write buffer type field.

For example, the turbo write buffer maximum size field (e.g., "dTurboWriteBufferMaxNAllocUnits") may include information about a maximum size of the turbo write buffer TWB supported at the whole device. The turbo write buffer maximum number field (e.g., "bDeviceMaxTurboWriteLUs") may include information about the maximum number of turbo write buffers supported at the UFS device 1200.

The turbo write buffer capacity adjustment factor field (e.g., "bTurboWriteBufferCapAdjFac") may include information about a capacity reduction factor according to a kind of a turbo write buffer memory. For example, in the case where the turbo write buffer TWB is implemented with the SLC and the user storage UST is implemented with the TLC, a value of the turbo write buffer capacity adjustment factor field may be "3". In the case where the turbo write buffer TWB is implemented with the SLC and the user storage UST is implemented with the MLC, a value of the turbo write buffer capacity adjustment factor field may be "2".

The supported turbo write buffer no user capacity reduction type field (e.g., "bSupportedTurboWriteBufferUserSpaceReductionType") may include information about a turbo write buffer mode that the UFS device 1200 supports (e.g., information about the user capacity reduction mode, the no user capacity reduction mode, or both).

The supported turbo write buffer type field (e.g., "bSupportedTurboWriteBufferTypes") may include information about a turbo write buffer type that the UFS device 1200 supports (e.g., information about the LU dedicated buffer type, the shared buffer type, or both).

The supported extended turbo write buffer user capacity reduction type field (e.g., "bSupportedExtendedTurboWriteBufferUserSpaceReductionTypes") may include information about a mode in which a turbo write buffer is configured (e.g., information about the user capacity reduction mode, the no user capacity reduction mode, or the partial-reduction mode).

The respective fields described above are an example, and at least some example embodiments are not limited thereto.

As described above, the UFS host 1100 may check a variety of information about the UFS device 1200, and may configure a turbo write buffer of the UFS device 1200. That is, through operation S101, a mode, a type, and a size of the turbo write buffer of the UFS device 1200 may be determined. According to at least one example embodiment, after the turbo write buffer is configured in operation S101, various fields associated with the turbo write buffer may have a fixed value by setting a specific value (e.g., "01h") to a configuration descriptor lock field (e.g., "bConfigDescrLock") of an ATTRIBUTE of the UFS device 1200.

Afterwards, in operation S102, the UFS host 1100 and the UFS device 1200 may perform a write operation. For example, the UFS host 1100 and the UFS device 1200 may repeatedly perform the normal operation or the turbo write operation as described with reference to FIG. 8.

In operation S103, the UFS host 1100 may determine whether reconfigure the turbo write buffer TWB. For example, the UFS host 1100 may check information of a resource used by the UFS device 1200, through the write operations in operation S102, and may determine whether there is a need to reconfigure the turbo write buffer TWB, based on the checked information.

For example, as described with reference to FIG. 2, while a write operation is repeatedly performed, an available space of the user storage UST may become insufficient. In this case, an available space of the user storage UST may be secured by returning or allocating a partial space of the turbo write buffer TWB to the user storage UST.

According to at least one example embodiment, as described with reference to FIG. 6 or 7, in the case where the turbo write buffer TWB is configured in the no user capacity reduction mode, the turbo write buffer TWB may be returned to the user storage UST by the UFS device 1200. However, because the return of the turbo write buffer TWB by the UFS device 1200 requires a separate flush operation, the reduction in performance may be additionally caused. That is, the UFS host 1100 may prevent the reduction in performance of the UFS device 1200 by reducing a size of the turbo write buffer TWB in advance.

According to at least one example embodiment, the information (hereinafter referred to as "hint information") that is used to determine whether to reconfigure the turbo write buffer TWB may be obtained from the UFS device 1200 or may be managed by the UFS host 1100.

According to at least one example embodiment, the hint information may include information about a current available size of the user storage UST in the UFS device 1200. For example, when the current available size of the user storage UST is equal to or smaller than a reference value, the UFS host 1100 may determine the reconfiguration of the turbo write buffer TWB.

According to at least one example embodiment, the hint information may include information about an available space of a turbo write buffer of the UFS device 1200. For example, the UFS device 1200 may set information about a current size of the turbo write buffer TWB at a current turbo write buffer size field (e.g., "dCurrentTurboWriteBufferSize") of the ATTRIBUTES and may set information about a ratio of a current available capacity of the turbo write buffer TWB at an available turbo write buffer size field (e.g., "dAvailableTurboWriteBufferSize") thereof. The UFS host 1100 may check a current available size of a turbo write buffer, by checking the current turbo write buffer size field and the available turbo write buffer size field of the ATTRIBUTES of the UFS device 1200. The UFS host 1100 may determine whether to reconfigure the turbo write buffer TWB based on the checked information. For example, in the case where an available space of the user storage UST is relatively smaller than an available space of the turbo write buffer TWB, the UFS host 1100 may determine the reconfiguration of the turbo write buffer TWB. For example, the UFS host 1100 may determine a size of the turbo write buffer TWB to be reconfigured, based on an available size of the turbo write buffer TWB.

According to at least one example embodiment, the hint information may include lifetime information about the turbo write buffer TWB of the UFS device 1200. According to at least one example embodiment, the UFS device 1200 may provide information about a lifetime of the turbo write buffer TWB based on the number of P/E cycles of a physical storage space (or a memory block) allocated or used for the turbo write buffer TWB. The UFS device 1200 may set information about a lifetime of the turbo write buffer TWB at a turbo write buffer lifetime estimation field (e.g., "dTurboWriteBufferLifeTimeEst") of the ATTRIBUTES. The UFS host 1100 may estimate the lifetime of the turbo write buffer TWB by checking the turbo write buffer lifetime estimation field of the ATTRIBUTES of the UFS device 1200 through a query request. According to at least one example embodiment, in the no user capacity reduction mode, because the user storage UST and the turbo write buffer TWB share the physical storage space PST, in the case where a write operation is performed on the user storage UST, the lifetime of the turbo write buffer TWB may decrease. According to at least one example embodiment, based on the lifetime information about the turbo write buffer TWB, the UFS host 1100 may determine the reconfiguration of the turbo write buffer TWB or may determine a size of the turbo write buffer TWB to be reconfigured.

In the case where there is no need to reconfigure the turbo write buffer TWB, without separate reconfiguration, the UFS host 1100 and the UFS device 1200 performs operation S102. In the case where there is a need to reconfigure the turbo write buffer TWB, in operation S100, the UFS host 1100 and the UFS device 1200 may perform the reconfiguration of the turbo write buffer TWB. For example, by reconfiguring a maximum size or a current size of the turbo write buffer TWB, the UFS host 1100 may return a physical storage space used for the turbo write buffer TWB to the user storage UST or may allocate a physical storage space used for the user storage UST to the turbo write buffer TWB. According to at least one example embodiment, the UFS host 1100 may change a size of a turbo write buffer by setting information of specific fields of the UFS device 1200.

As described above, according to at least one example embodiment, the UFS host 1100 may change a current size or a maximum size of the turbo write buffer TWB during driving the UFS device 1200. In this case, because the overhead (e.g., an additional flush operation) due to the return of the turbo write buffer TWB by the UFS device 1200 is prevented, the overall performance of the UFS system 1000 is improved.

In the above embodiment, the description is given as the UFS host 1100 changes or reconfigures a size of the turbo write buffer TWB of the UFS device 1200, but at least some example embodiments are not limited thereto. The UFS host 1100 may change or reconfigure a variety of information associated with the turbo write buffer TWB, such as a size, a mode, or a type of the turbo write buffer TWB, through the reconfiguration of the turbo write buffer TWB.

Figure 10:
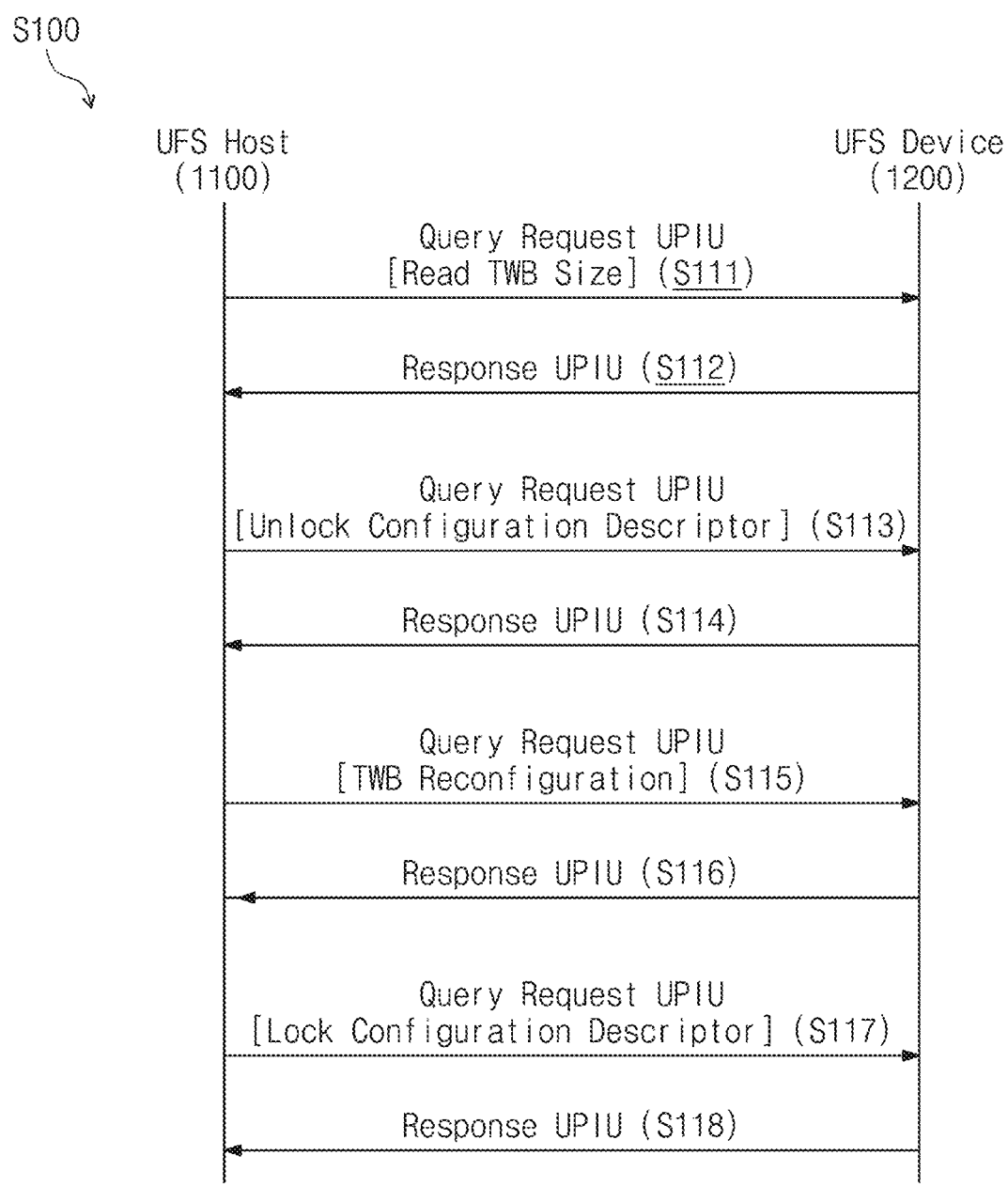
FIGS. 10 and 11 are flowcharts illustrating an operation of reconfiguring a turbo write buffer, which is described with reference to FIG. 9.
Figure 11:
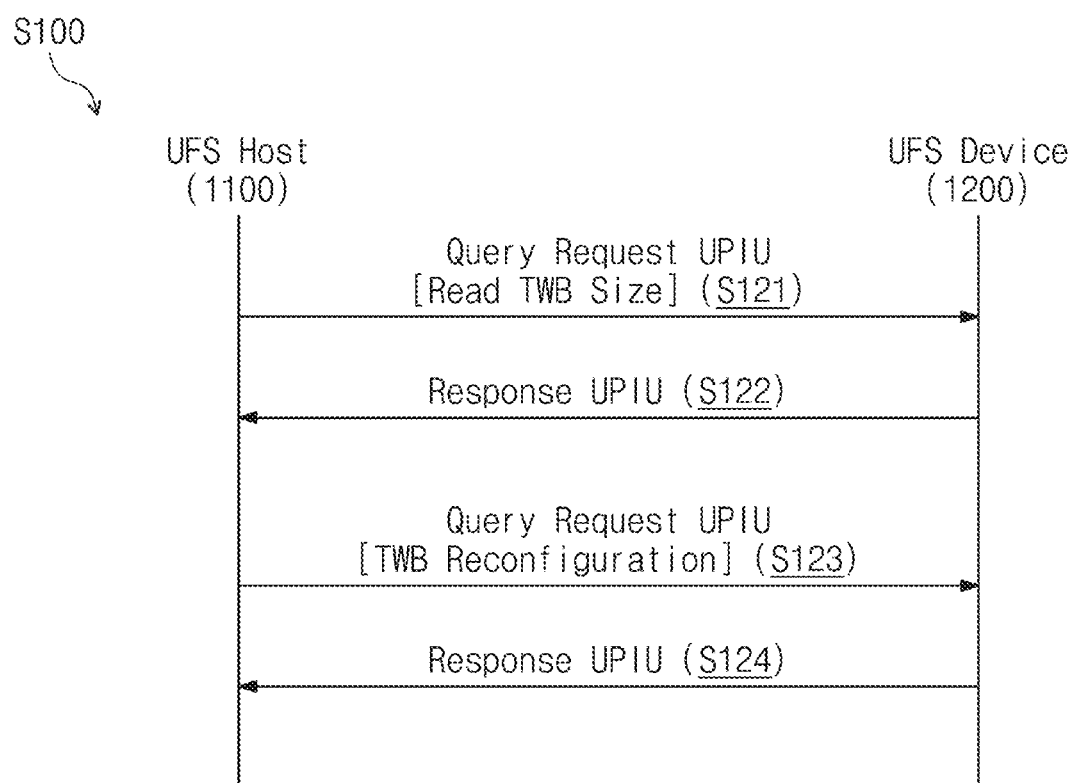

FIGS. 10 and 11 are flowcharts illustrating an operation of reconfiguring a turbo write buffer, which is described with reference to FIG. 9. The flowcharts of FIGS. 10 and 11 show operation S100 of FIG. 9 in detail. For convenience of description, it is assumed that to reconfigure the turbo write buffer TWB is to reconfigure a size of the turbo write buffer TWB. However, at least some example embodiments are not limited thereto. For example, a variety of information such as a size, a mode, or a type of the turbo write buffer TWB may be reconfigured through the reconfiguration of the turbo write buffer TWB.

Referring to FIGS. 1, 2, 9, and 10, the UFS host 1100 and the UFS device 1200 may perform the reconfiguration of the turbo write buffer TWB in operation S110 through operation S111 to operation S118.

In operation S111, the UFS host 1100 may send a query request UPIU to the UFS device 1200. The query request UPIU in operation S111 may be a request for reading information about a size of the turbo write buffer TWB. For example, as described with reference to FIG. 9, the UFS host 1100 may check a current available size of the turbo write buffer TWB based on the current turbo write buffer size field (e.g., "dCurrentTurboWriteBufferSzie") of the ATTRIBUTES and the available turbo write buffer size field (e.g., "dAvailableTurboWriteBufferSize") of the ATTRIBUTES. In this case, the query request UPIU in operation S111 may be a request for reading the current turbo write buffer size field (e.g., "dCurrentTurboWriteBufferSzie") of the ATTRIBUTES and the available turbo write buffer size field (e.g., "dAvailableTurboWriteBufferSize") of the ATTRIBUTES, and a response UPIU in operation S112 may be a response including the above field values.

According to at least one example embodiment, the UFS host 1100 may check a current available size of the turbo write buffer TWB in the UFS device 1200 through operation S111 and operation S112, and may determine a size of the turbo write buffer TWB to be reconfigured, based on the available size of the turbo write buffer TWB.

In operation S113, the UFS host 1100 may send the query request UPIU to the UFS device 1200; in operation S114, the UFS device 1200 may send a response UPIU to the UFS host 1100.

According to at least one example embodiment, the query request UPIU in operation S113 may be a request for unlocking the configuration descriptor. For example, after the turbo write buffer TWB is configured for the first time, information about the turbo write buffer TWB may be set at various fields. In this case, to prevent a change of the fields thus set, a configuration descriptor lock field (e.g., "bConfigDescrLock") of the ATTRIBUTES may be set with a specific value (e.g., "01h"). In the case where the configuration descriptor lock field (e.g., "bConfigDescrLock") of the ATTRIBUTES is set with the specific value (e.g., "01h"), a write operation associated with the fields where the information about the turbo write buffer TWB is stored is processed as fail. Accordingly, to reconfigure the turbo write buffer TWB, the UFS host 1100 may unlock the configuration descriptor by changing a value of the configuration descriptor lock field (e.g., "bConfigDescrLock") of the ATTRIBUTES to another value (e.g., "00h").

According to at least one example embodiment, to unlock the configuration descriptor, instead of changing a value of the configuration descriptor lock field of the ATTRIBUTES of the UFS device 1200, a special field capable of reconfiguring the turbo write buffer TWB or temporarily unlocking the configuration descriptor may be set. According to at least one example embodiment, the special field may be one of reserved fields of a variety of information such as the ATTRIBUTES and the FLAG of the UFS device 1200.

In operation S115, the UFS host 1100 may send the query request UPIU to the UFS device 1200. In operation S116, the UFS device 1200 may transfer the response UPIU to the query request UPIU to the UFS host 1100.

According to at least one example embodiment, the query request UPIU in operation S115 may be a request for reconfiguring the turbo write buffer TWB. For example, through the query request UPIU in operation S115, field values associated with a size of the turbo write buffer TWB may be changed. For example, fields associated with the size of the turbo write buffer TWB may include fields such as the turbo write buffer allocation number field per logical unit (e.g., "dLUNumTurboWriteBufferAllocUnits") of the unit descriptor, the shared turbo write buffer allocation unit number field (e.g., "dNumSharedTurboWriteBufferAllocUnits") of the device descriptor or the configuration descriptor, the current turbo write buffer size field (e.g., "dCurrentTurboWriteBufferSize") of the ATTRIBUTES, the turbo write buffer maximum size field (e.g., "dTurboWriteBufferMaxNAllocUnits"), and the turbo write buffer capacity adjustment factor field (e.g., "bTurboWriteBufferCapAdjFac").

As values of the above fields are reconfigured, a size of the turbo write buffer TWB may be adjustable. As the size of the turbo write buffer TWB is adjustable, the user storage UST may be secured. For example, as the turbo write buffer allocation number field per logical unit (e.g., "dLUNumTurboWriteBufferAllocUnits") of the unit descriptor is adjusted, a size of a turbo write buffer to be allocated per logical unit may be adjusted. As the shared turbo write buffer allocation unit number field (e.g., "dNumSharedTurboWriteBufferAllocUnits") of the device descriptor or the configuration descriptor is adjusted, a size of a shared turbo write buffer may be adjusted. As the current turbo write buffer size field (e.g., "dCurrentTurboWriteBufferSize") of the ATTRIBUTES is adjusted, a size of the turbo write buffer TWB that should be currently used or secured at the UFS device 1200 may be adjusted. As the turbo write buffer maximum size field (e.g., "dTurboWriteBufferMaxNAllocUnits") is adjusted, a maximum size of the turbo write buffer TWB may be adjusted. As the turbo write buffer capacity adjustment factor field (e.g., "bTurboWriteBufferCapAdjFac") is adjusted, even though a size of a turbo write buffer is not variable, a size of a physical storage space corresponding to the turbo write buffer may be variable. For example, in the case where the turbo write buffer capacity adjustment factor field (e.g., "bTurboWriteBufferCapAdjFac") is changed from "MLC" to "TLC" or "QLC", even though a capacity of the turbo write buffer TWB is maintained, a physical storage space for the turbo write buffer TWB may be reduced, and the remaining physical storage space may be used as the user storage UST.

According to at least one example embodiment, some of the field values described above may not be changed according to a value of the configuration descriptor lock field. However, as the UFS host 1100 changes a value of the configuration descriptor lock field or sets the special field through operation S112 and operation S113, some of the field values described above may be changed.

After the reconfiguration of the turbo write buffer TWB is completed, in operation S117, the UFS host 1100 may send the query request UPIU to the UFS device 1200. In operation S118, the UFS device 1200 may send the response UPIU to the UFS host 1100. According to at least one example embodiment, operation S117 and operation S118 may be operations for changing a value of the configuration descriptor lock field to a lock state (e.g., "01h") or changing a value of the special field such that the configuration descriptor is locked. According to at least one example embodiment, in the case where the configuration descriptor is temporarily unlocked by setting the special field, when there is no need to again change a value of the special field, operation S117 and operation S118 will be omitted.

Next, referring to FIGS. 1, 2, 9, and 11, the UFS host 1100 and the UFS device 1200 may perform the reconfiguration of the turbo write buffer TWB in operation S100 through operation S121 to operation S124. Operation S121 and operation S122 are similar to operation S111 and operation S112 of FIG. 10, and thus, additional description will be omitted to avoid redundancy.

In operation S123, the UFS host 1100 may send the query request UPIU to the UFS device 1200. In operation S124, the UFS device 1200 may send the response UPIU to the UFS host 1100. The query request UPIU in operation S123 may be a request for reconfiguring the turbo write buffer TWB.

Unlike the embodiment of FIG. 10, in the embodiment of FIG. 11, the UFS host 1100 may reconfigure the turbo write buffer TWB without unlocking the configuration descriptor. For example, fields associated with a size, a mode, or a type of the turbo write buffer TWB may be set at any other descriptor(s) (e.g., the FLAG or the ATTRIBUTES) except for the configuration descriptor. In this case, the other descriptor(s) may include fields capable of being read and written by the UFS host 1100. That is, in the case where a field or information associated with a size of the turbo write buffer TWB is included in a descriptor capable of being read and written by the UFS host 1100 regardless of whether the configuration descriptor is locked, the UFS host 1100 may reconfigure the turbo write buffer TWB without unlocking the configuration descriptor.

According to at least one example embodiment, the field or information associated with the size, the mode, or the type of the turbo write buffer TWB may be set at a separate special field. In this case, the UFS host 1100 may reconfigure the turbo write buffer TWB without unlocking the configuration descriptor.

As described above, the UFS host 1100 according to at least one example embodiment may actively reconfigure the turbo write buffer TWB of the UFS device 1200 depending on an operation state of the UFS device 1200. In this case, compared to the case where the turbo write buffer TWB is returned to the user storage UST by the UFS device 1200, a separate overhead may be prevented, and thus, the overall performance of the UFS system 1000 may be improved.

Figure 12:
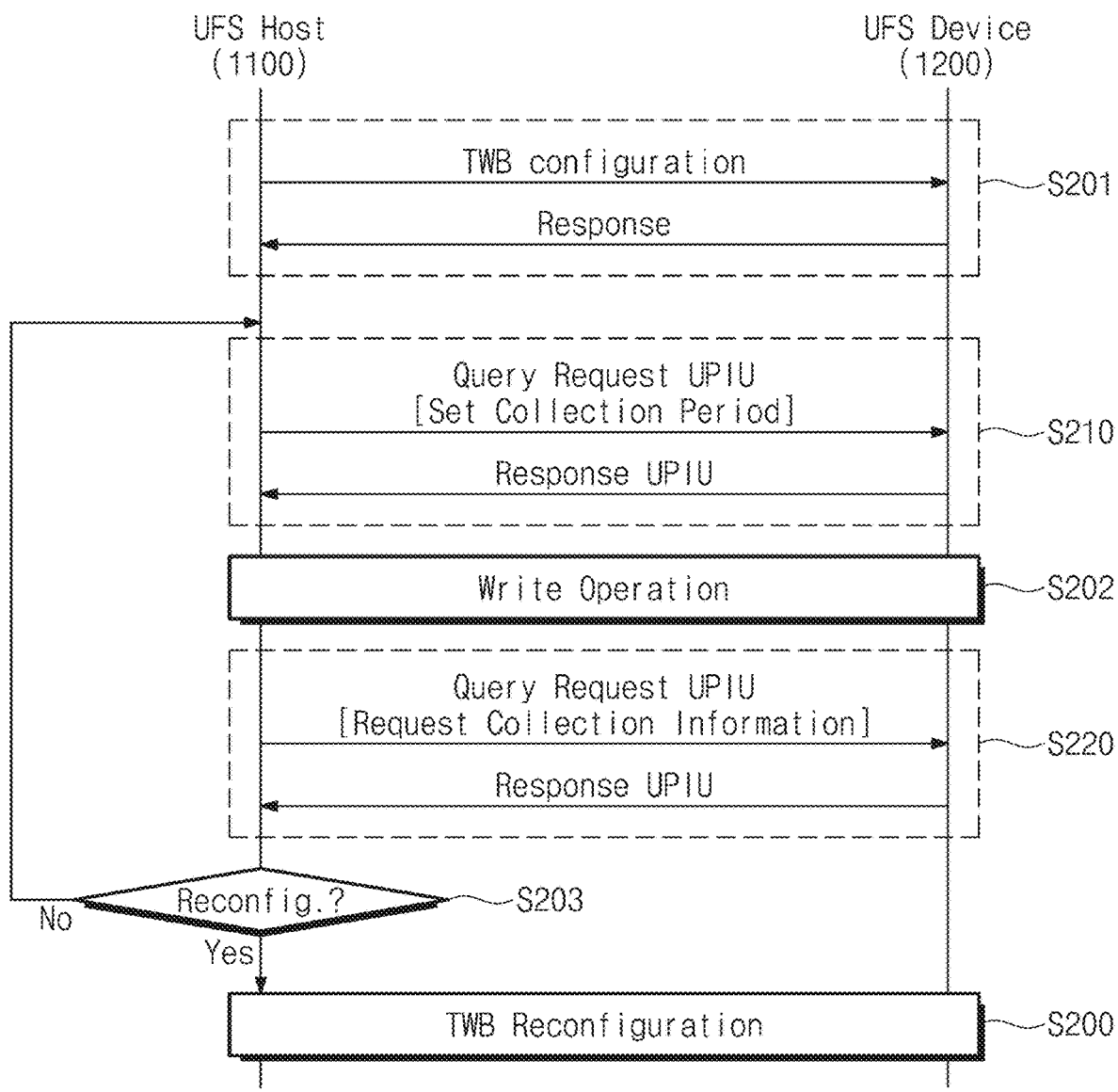
FIG. 12 is a flowchart illustrating an operation of a UFS system of FIG. 1.

FIG. 12 is a flowchart illustrating an operation of a UFS system of FIG. 1. For convenience of description, additional description associated with the components described above will be omitted to avoid redundancy. Referring to FIGS. 1, 2, and 12, the UFS host 1100 and the UFS device 1200 may perform operation S201, operation S210, operation S202, operation S220, operation S203, and operation S200. Operation S201, operation S220, operation S203, and operation S200 are similar to operation S101, operation S102, operation S103, and operation S100 of FIG. 9, and thus, additional description will be omitted to avoid redundancy.

In the embodiment of FIG. 9, the UFS host 1100 determines whether to reconfigure the turbo write buffer TWB or automatically manages hint information necessary for reconfiguration. In contrast, in the embodiment of FIG. 12, the hint information may be gathered and managed by the UFS device 1200. For example, after the turbo write buffer TWB is configured in operation S201, in operation S210, the UFS host 1100 may send the query request UPIU to the UFS device 1200, and the UFS device 1200 may send the response UPIU to the UFS host 1100. The query request UPIU in operation S210 may be a request for setting an interval where hint information is gathered, that is, a gathering interval or a gathering period. For example, the UFS host 1100 may set the interval for gathering the hint information. Afterwards, during the interval set by the UFS host 1100, the UFS device 1200 may perform various operations (e.g., operation S202, a normal write operation, a turbo write operation, a normal read operation, a turbo read operation, or an erase operation) under control of the UFS host 1100 or depending on an internal maintenance policy and may gather the hint information based on results of the operations thus performed.

According to at least one example embodiment, the hint information gathered by the UFS device 1200 may include usage information about a turbo write buffer used during the gathering interval, such as a total usage, an average usage, or a maximum usage. According to at least one example embodiment, the UFS device 1200 may calculate an optimum capacity of a turbo write buffer necessary for the UFS device 1200 based on the hint information gathered during the gathering interval set by the UFS host 1100, and the calculated information may be included in the hint information.

After the set gathering interval expires, in operation S220, the UFS host 1100 may send the query request UPIU to the UFS device 1200, and the UFS device 1200 may send the response UPIU to the UFS host 1100. According to at least one example embodiment, the query request UPIU in operation S220 may be a request for reading the hint information gathered by the UFS device 1200 during the gathering interval, and the response UPIU in operation S220 may include the hint information gathered by the UFS device 1200 during the gathering interval.

Afterwards, the UFS host 1100 may determine whether to reconfigure the turbo write buffer TWB based on the hint information and may reconfigure a turbo write buffer depending on a determination result. This is described above, and thus, additional description will be omitted to avoid redundancy.

As described above, the UFS host 1100 may configure the turbo write buffer TWB based on the hint information. In the above embodiments, the description is given as the UFS host 1100 determines whether to reconfigure the turbo write buffer TWB based on the hint information, but at least some example embodiments are not limited thereto. For example, to secure a space of the user storage UST or to prevent the reduction in performance of the normal write operation, the UFS host 1100 may determine whether to reconfigure the turbo write buffer TWB; when the reconfiguration of the turbo write buffer TWB is determined, the UFS host 1100 may perform an operation for gathering the hint information.

FIGS. 13 to 17 are diagrams for describing a reconfigured turbo write buffer according to at least one example embodiment. Respective areas illustrated in FIGS. 13 to 18 are similar to those described with reference to FIGS. 5 to 7, and for convenience of description, additional description will be omitted to avoid redundancy. Also, for convenience, the description will be given as the reconfiguration of the turbo write buffer TWB is performed such that a physical storage space for the user storage UST is secured. However, at least some example embodiments are not limited thereto. For example, the reconfiguration of the turbo write buffer TWB may be performed such that a space of the turbo write buffer TWB is secured or performance is improved.

Figure 13:
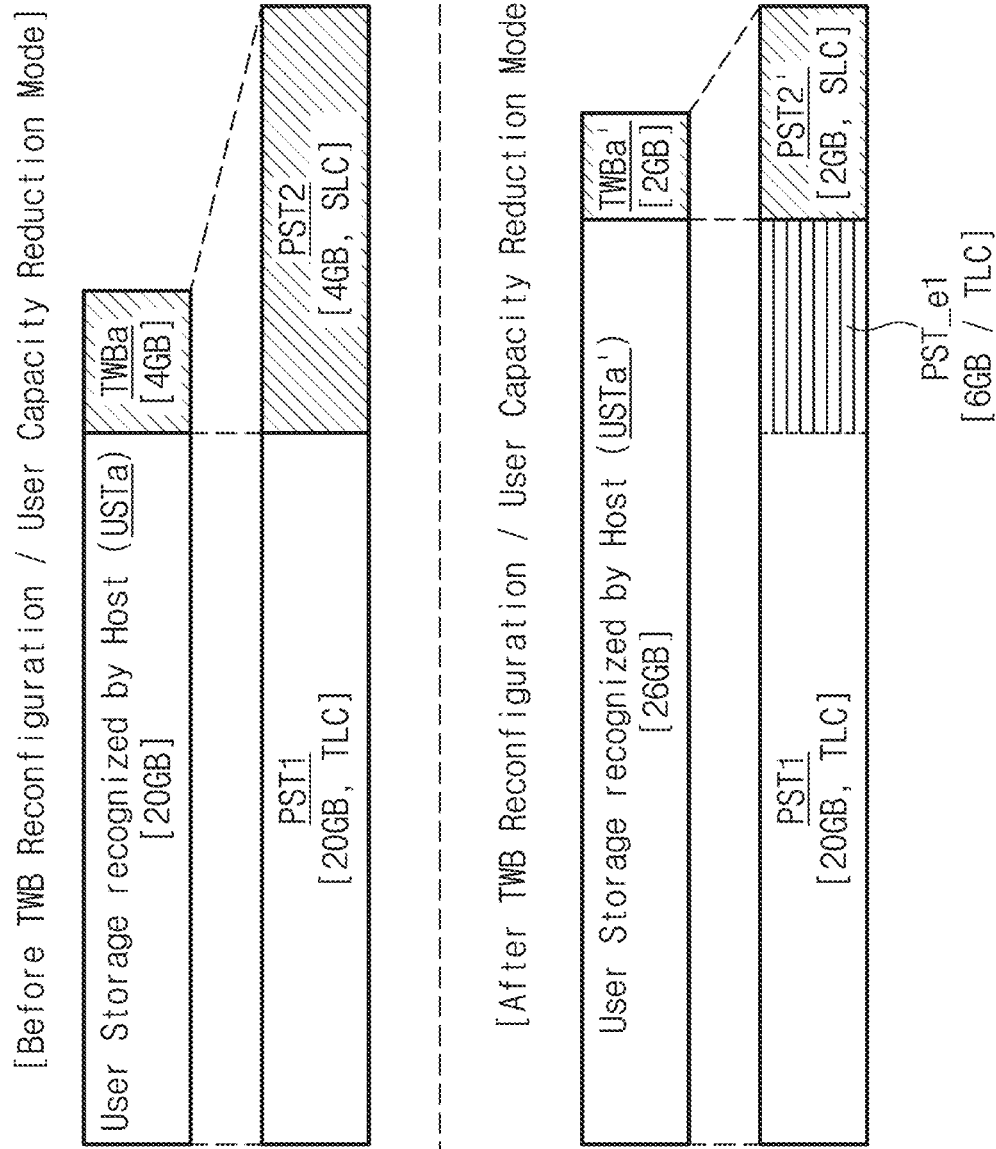
FIGS. 13 to 17 are diagrams for describing a reconfigured turbo write buffer according to at least one example embodiment.

First, referring to FIGS. 1, 2, and 13, the turbo write buffer TWBa of the UFS device 1200 may be configured according to the user capacity reduction mode. The configuration of the turbo write buffer TWBa based on the user capacity reduction mode is similar to that described with reference to FIG. 5, and thus, additional description will be omitted to avoid redundancy.

The TWB reconfiguration may be performed such that a capacity of the turbo write buffer TWBa is reduced. For example, as illustrated in FIG. 13, after the TWB reconfiguration, a capacity of a turbo write buffer TWBa' may decrease to 2 GB. In this case, a second physical storage space PST2' corresponding to the turbo write buffer TWBa' may decrease to 2 GB on the basis of the SLC, and thus, a first extended physical storage space PST_e1 of 6 GB on the basis of the TLC is returned. The first extended physical storage space PST_e1 may be used as user storage USTa', and thus, the user storage USTa' may be recognized by the UFS host 1100 as having a capacity of 26 GB. That is, compared to before the reconfiguration of the turbo write buffer TWB, a capacity of the user storage USTa' may increase after the turbo write buffer TWB is reconfigured.

Figure 14:
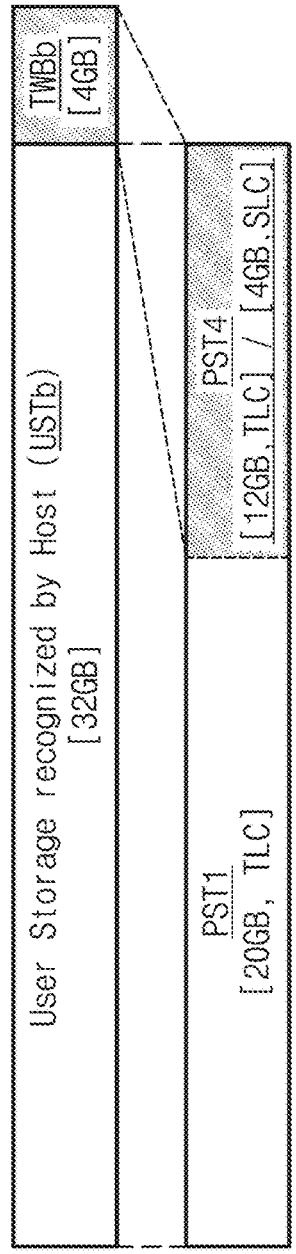
Figure 14:
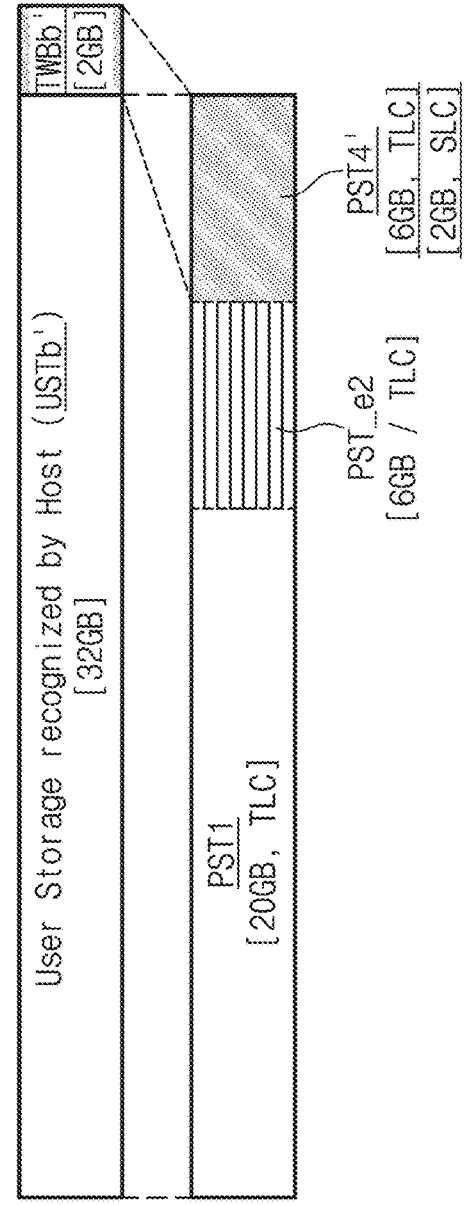

Next, referring to FIGS. 1, 2, and 14, the turbo write buffer TWBb of the UFS device 1200 may be configured according to the no user capacity reduction mode. The configuration of the turbo write buffer TWBb based on the no user capacity reduction mode is similar to that described with reference to FIG. 6, and thus, additional description will be omitted to avoid redundancy.

As in the embodiment of FIG. 13, in the embodiment of FIG. 14, a size of the turbo write buffer TWBb may decrease through the TWB reconfiguration. For example, as illustrated in FIG. 14, a capacity of a turbo write buffer TWBb' may decrease from 4 GB to 2 GB. In this case, a fourth physical storage space PST4' corresponding to the turbo write buffer TWBb' may decrease from 4 GB to 2 GB on the basis of the SLC, and thus, a second extended physical storage space PST_e2 being 6 GB on the basis of the TLC may be returned.

In the case of the no user capacity reduction mode, because there is no change in a user capacity due to the TWB configuration, there is no change in a capacity of the user storage USTb. However, as a size of the turbo write buffer TWBb' decreases, a size of the fourth physical storage space PST4' allocated to the turbo write buffer TWBb' may decrease, and thus, a physical storage space that the user storage USTb may use exclusively may increase as much as the second extended physical storage space PST_e2.

Figure 15:
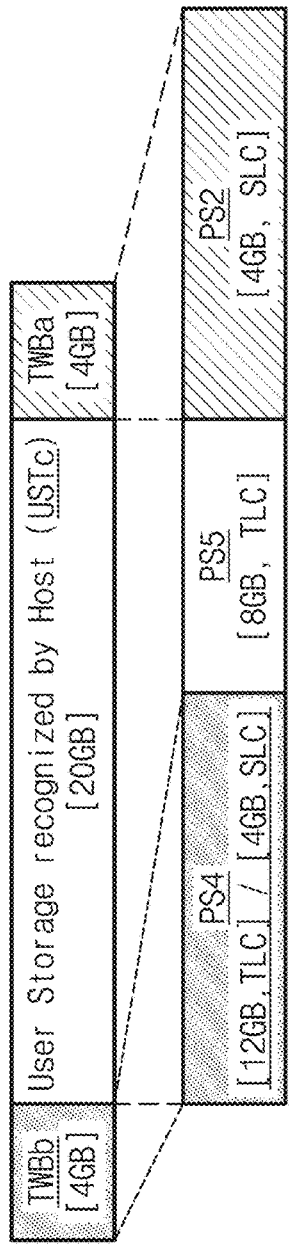
Figure 15:
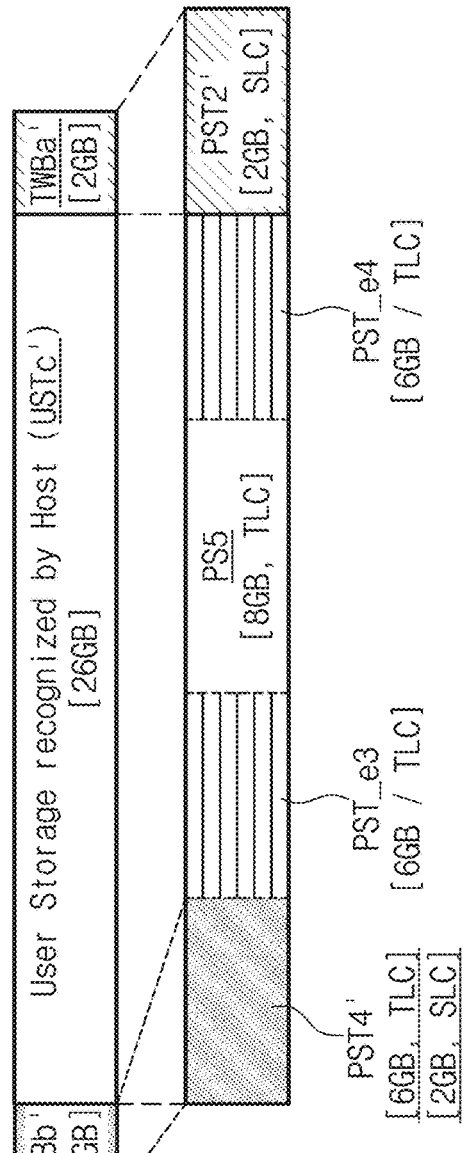

Then, referring to FIGS. 1, 2, and 15, the turbo write buffer TWBb of the UFS device 1200 may be configured according to the partial-reduction mode. The configuration of the turbo write buffers TWBa and TWBb based on the partial-reduction mode is similar to that described with reference to FIG. 7, and thus, additional description will be omitted to avoid redundancy.

In the embodiment of FIG. 15, to reconfigure the turbo write buffers TWBa and TWBb is similar to that according to a combination of the embodiments of FIGS. 13 and 14, and thus, additional description will be omitted to avoid redundancy. According to at least one example embodiment, a third extended physical storage space PST_e3 may be secured by the reconfiguration of the turbo write buffer TWBb', and the fourth extended physical storage space PST_e4 may be secured by the reconfiguration of the turbo write buffer TWBa'. The user storage USTc' may increase as much as 6 GB through the fourth extended physical storage space PST_e4 being 6 GB on the basis of the TLC.

Through the third extended physical storage space PST_e3 being 6 GB on the basis of the TLC and the fourth extended physical storage space PST_e4 being 6 GB on the basis of the TLC, a physical storage space that a user storage USTc' may use exclusively may increase as much as 12 GB.

In the above embodiments, the UFS host 1100 secures a physical storage space for the user storage UST by directly changing a size of the turbo write buffer TWB. According to at least one example embodiment, the UFS host 1100 may increase a capacity of the user storage UST without directly changing a size of the turbo write buffer TWB.

Figure 16:
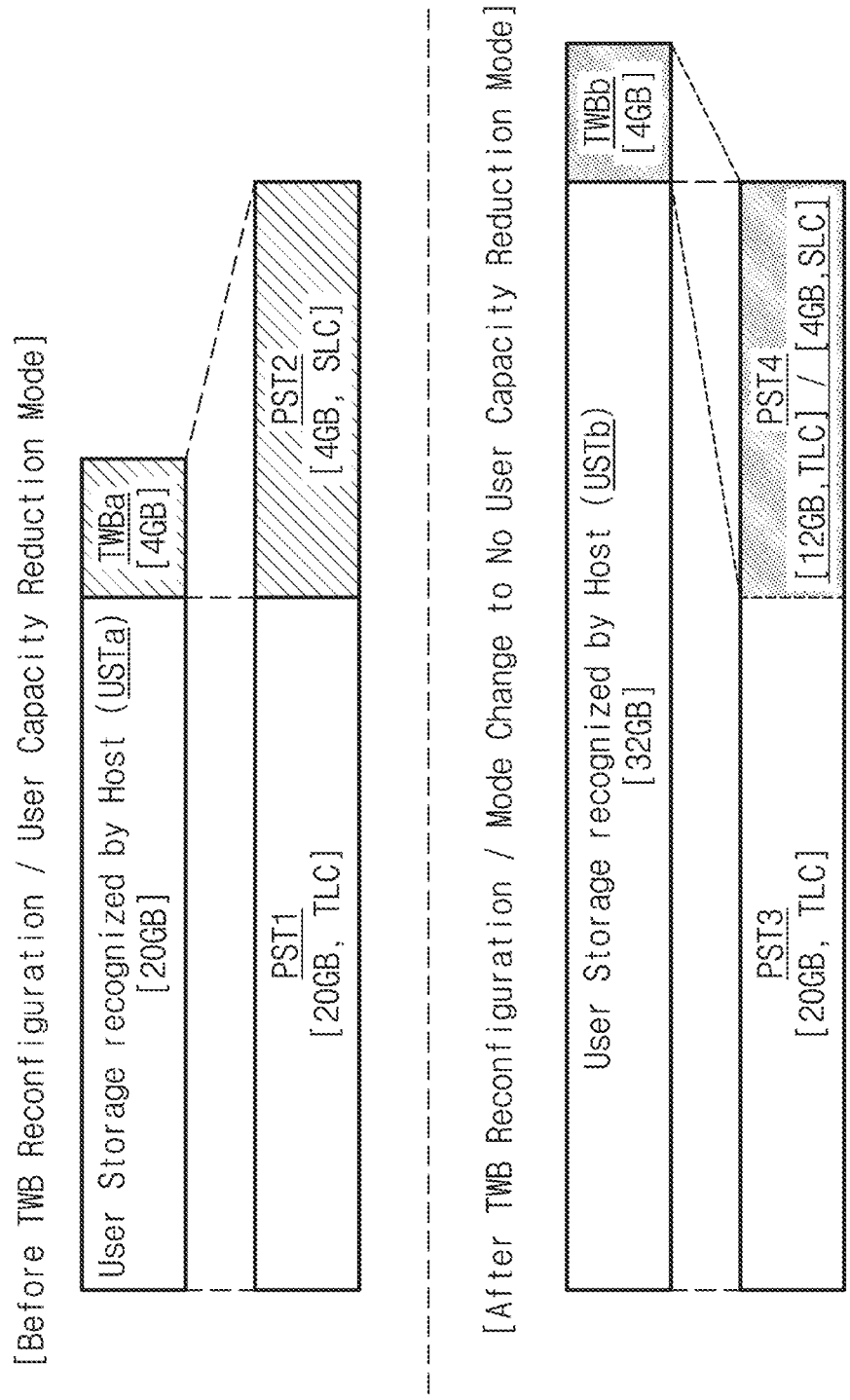

For example, referring to FIGS. 1, 2, and 16, the turbo write buffer TWBa of the UFS device 1200 may be configured according to the user capacity reduction mode. The configuration of the turbo write buffer TWBa based on the user capacity reduction mode is similar to that described with reference to FIG. 5, and thus, additional description will be omitted to avoid redundancy.

As a mode of the turbo write buffer TWB is changed, the TWB reconfiguration may be performed. As illustrated in FIG. 16, a mode for a turbo write buffer may be changed from the user capacity reduction mode to the no user capacity reduction mode. In this case, the second physical storage space PST2 that is allocated to the turbo write buffer TWBa and is not recognized as the user storage USTa is changed to the fourth physical storage space PST4 recognized as the user storage USTb. Accordingly, the user storage USTb may increase from 20 GB to 32 GB. That is, a capacity of the user storage UST may be variable by changing a mode of the turbo write buffer TWB, with a size of the turbo write buffer TWB maintained.

According to at least one example embodiment, depending on an implementation scheme, the TWB reconfiguration may provide a mode switch between the user capacity reduction mode, the no user capacity reduction mode, and the partial-reduction mode.

Figure 17:
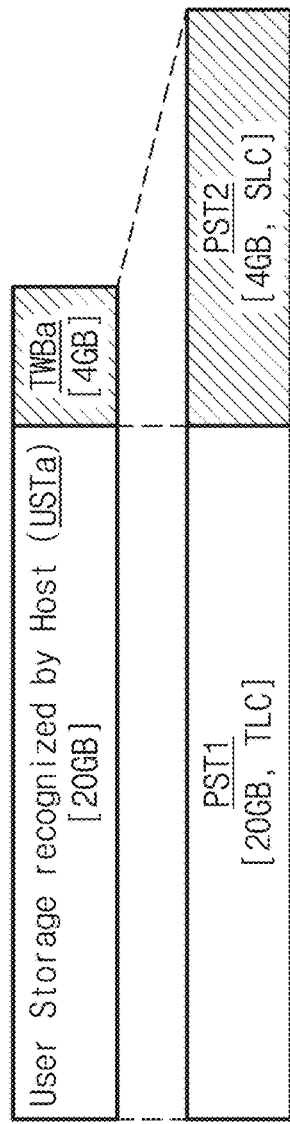
Figure 17:
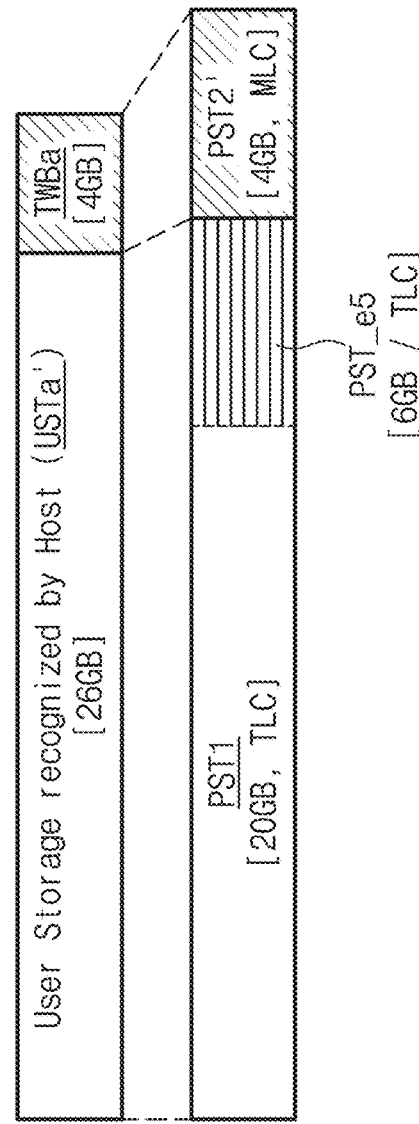

Referring to FIGS. 1, 2, and 17, the turbo write buffer TWBa of the UFS device 1200 may be configured according to the user capacity reduction mode. The configuration of the turbo write buffer TWBa based on the user capacity reduction mode is similar to that described with reference to FIG. 5, and thus, additional description will be omitted to avoid redundancy.

The UFS host 1100 may perform the TWB reconfiguration by changing a capacity adjustment factor of the turbo write buffer TWBa. The capacity adjustment factor may indicate information (e.g., SLC, MLC, TLC, or QLC information) about the number of bits that each cell of a physical storage space allocated to the turbo write buffer TWB stores. As the capacity adjustment factor increases in a state where a capacity of the turbo write buffer TWBa is fixed, a size of a physical storage space allocated to the turbo write buffer TWBa may decrease.

That is, as illustrated in FIG. 17, the UFS host 1100 may change the capacity adjustment factor of the turbo write buffer TWBa from SLC to MLC. In this case, a size of the turbo write buffer TWBa may be maintained at 4 GB. However, memory cells of a second physical storage space PST2' corresponding to the turbo write buffer TWBa may be used as MLC, and thus, a physical size of the second physical storage space PST2' may decrease. A fifth extended physical storage space PST_e5 may be secured as much as the decrement of the physical size of the second physical storage space PST2'. According to at least one example embodiment, a physical size of the second physical storage space PST2 being 4 GB on the basis of the SLC may decrease to a physical size of the second physical storage space PST2' being 4 GB on the basis of the MLC, and the fifth extended physical storage space PST_e5 corresponding to the reduced physical size may be 6 GB on the basis of the TLC. The fifth extended physical storage space PST_e5 being 6 GB on the basis of the TLC may be used as the user storage USTa'.

As described above, the UFS host 1100 may reconfigure the turbo write buffer TWB of the UFS device 1200 through various schemes or by changing various field values. According to at least one example embodiment, the UFS host 1100 may reconfigure the turbo write buffer TWB during driving the UFS device 1200 (i.e., without a separate reset or initialization operation).

Embodiments in which a size, a mode, and a capacity adjustment factor of the turbo write buffer TWB are changed are described above, but at least some example embodiments are not limited thereto. For example, the UFS host 1100 may reconfigure the turbo write buffer TWB based on each of the above embodiments or a combination of all or some of the above embodiments. The above embodiments are examples for reconfiguring the turbo write buffer TWB and are not intended to limit example embodiments of the inventive concepts.

Figure 18:
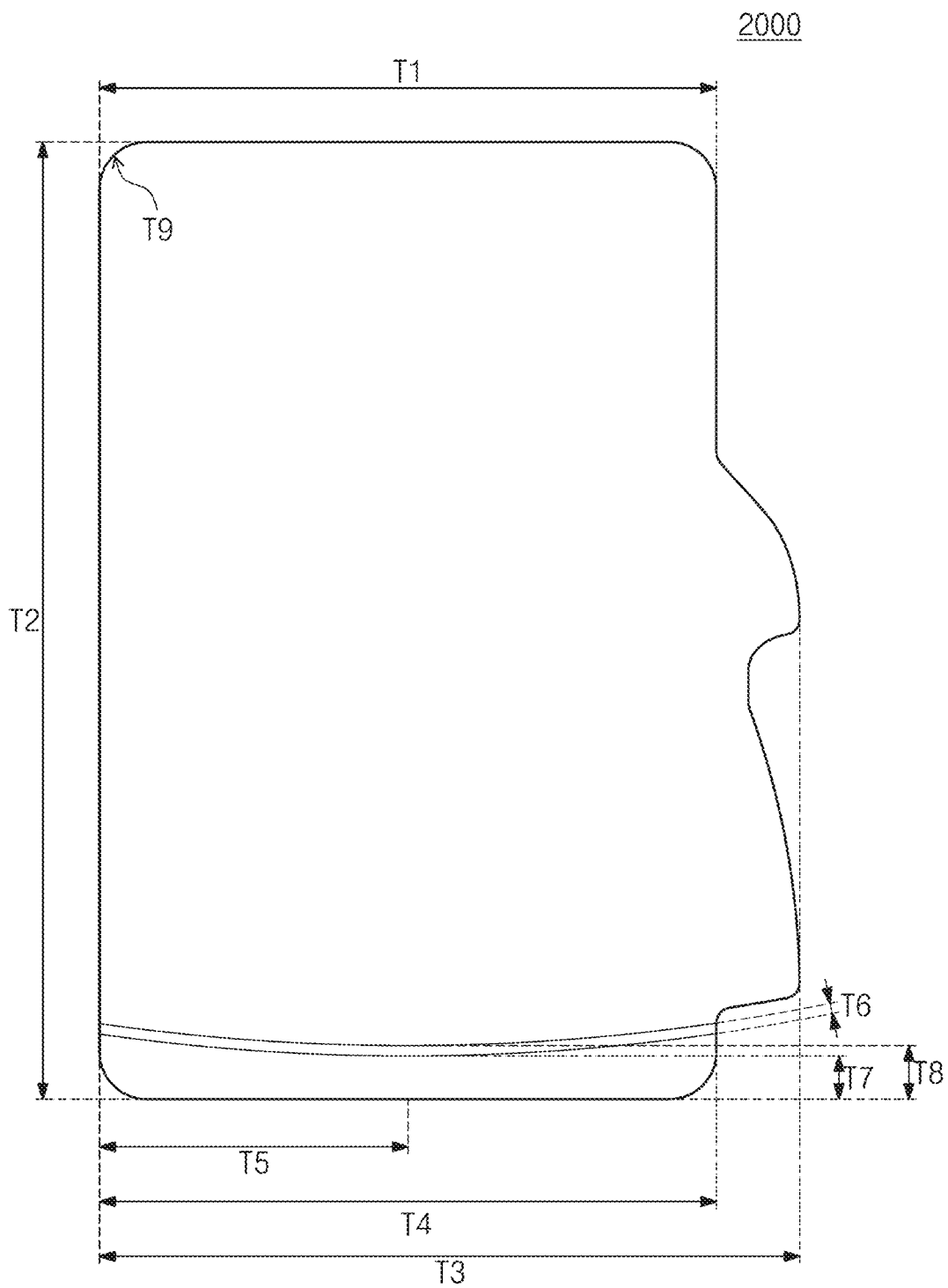
FIGS. 18 to 20 are diagrams for describing a form factor of a UFS card.
Figure 19:
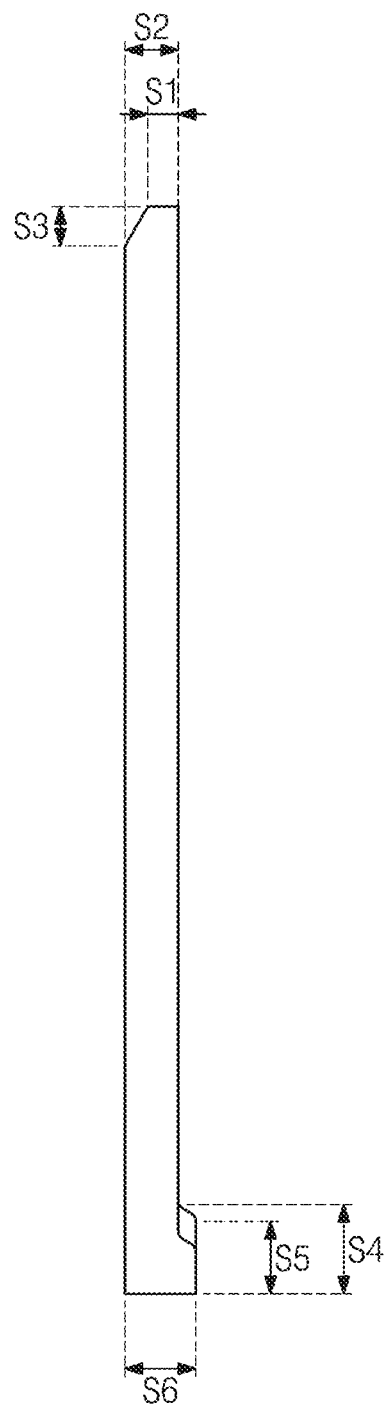
Figure 20:
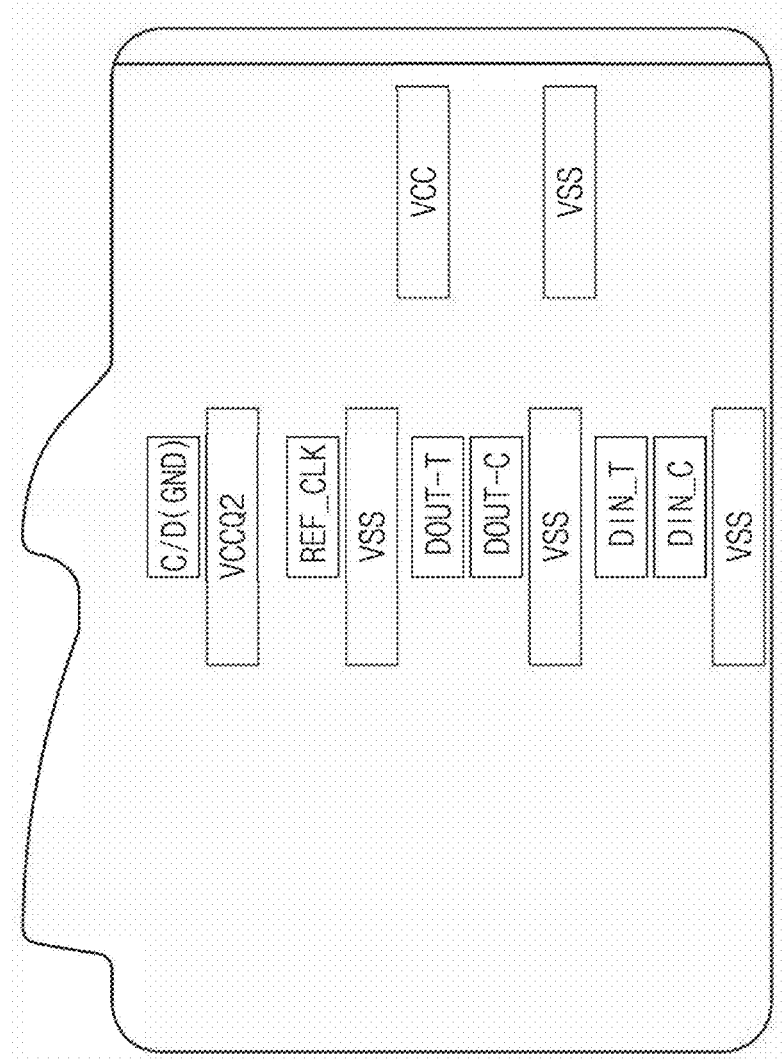

FIGS. 18 to 20 are diagrams of a form factor of a UFS card 2000. When the UFS system 1000 described with reference to FIGS. 1 to 16 is implemented as the UFS card 2000, an outer appearance of the UFS card 2000 may be as shown in FIGS. 18 to 20.

FIG. 18 is a top view of the UFS card 2000, according to an example embodiment. Referring to FIG. 18, it can be seen that the UFS card 2000 entirely follows a shark-shaped design. In FIG. 18, the UFS card 2000 may have dimensions shown in Table 1 below as an example.

TABLE 1

| Item | Dimension (mm) |
|------|---------------|
| T1 | 9.70 |
| T2 | 15.00 |
| T3 | 11.00 |
| T4 | 9.70 |

TABLE 1-continued

| Item | Dimension (mm) |
|------|---------------|
| T5 | 5.15 |
| T6 | 0.25 |
| T7 | 0.60 |
| T8 | 0.75 |
| T9 | R0.80 |

FIG. 19 is a side view of the UFS card 2000, according to an example embodiment. In FIG. 19, the UFS card 2000 may have dimensions shown in Table 2 below as an example.

TABLE 2

| Item | Dimension (mm) |
|------|---------------|
| S1 | 0.74 ± 0.06 |
| S2 | 0.30 |
| S3 | 0.52 |
| S4 | 1.20 |
| S5 | 1.05 |
| S6 | 1.00 |

FIG. 20 is a bottom view of the UFS card 2000, according to an example embodiment. Referring to FIG. 20, a plurality of pins for electrical contact with a UFS slot may be formed on a bottom surface of the UFS card 2000. Functions of each of the pins will be described below. Based on symmetry between a top surface and the bottom surface of the UFS card 2000, some pieces (e.g., T1 to T5 and T9) of information about the dimensions described with reference to FIG. 18 and Table 1 may also be applied to the bottom view of the UFS card 2000, which is shown in FIG. 20.

A plurality of pins for an electrical connection with a UFS host may be formed on the bottom surface of the UFS card 2000. Referring to FIG. 20, a total number of pins may be 12. Each of the pins may have a rectangular shape, and signal names corresponding to the pins may be as shown in FIG. 20. Specific information about each of the pins will be understood with reference to Table 3 below and the above description presented with reference to FIG. 1.

TABLE 3

| No. | Signal Name | Description | Dimension (mm) |
|-----|-------------|-------------|----------------|
| 1 | Vss | Ground (GND) | 3.00 × 0.72 ± 0.05 |
| 2 | DIN_C | Differential input signals input from a | 1.50 × 0.72 ± 0.05 |
| 3 | DIN_T | host to the UFS card 4000 (DIN_C is a negative node, and DIN_T is a positive node) | |
| 4 | Vss | Ground (GND) | 3.00 × 0.72 ± 0.05 |
| 5 | DOUT_C | Differential output signals output from | 1.50 × 0.72 ± 0.05 |
| 6 | DOUT_T | the UFS card 4000 to the host (DOUT_C is a negative node, and DOUT_T is a positive node) | |
| 7 | Vss | Ground (GND) | 3.00 × 0.72 ± 0.05 |
| 8 | REF_CLK | Reference clock signal provided from the host to the UFS card 4000 | 1.50 × 0.72 ± 0.05 |
| 9 | VCCQ2 | Power supply voltage provided mainly to a PHY interface or a controller and having a lower value than voltage Vcc | 3.00 × 0.72 ± 0.05 |
| 10 | C/D(GND) | Card detection signal | 1.50 × 0.72 ± 0.05 |
| 11 | Vss | Ground (GND) | 3.00 × 0.80 ± 0.05 |
| 12 | Vcc | Main power supply voltage | |

Figure 21:
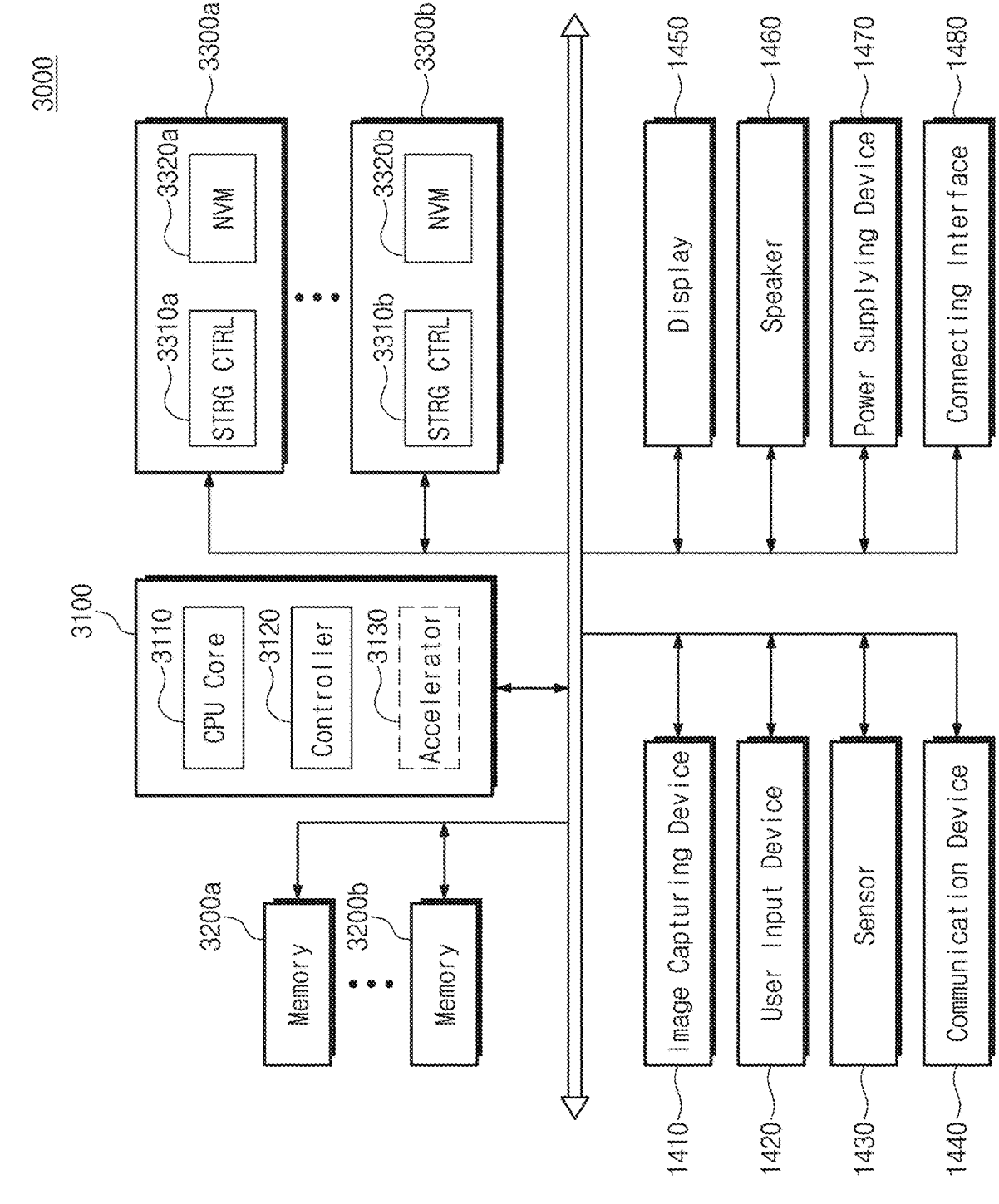
FIG. 21 is a diagram illustrating a system to which a storage device according to at least one example embodiment is applied.

FIG. 21 is a diagram of a system 3000 to which a storage device is applied, according to an embodiment. The system 3000 of FIG. 21 may basically be a mobile system, such as a portable communication terminal (e.g., a mobile phone), a smartphone, a tablet personal computer (PC), a wearable device, a healthcare device, or an Internet of things (IOT) device. However, the system 3000 of FIG. 21 is not necessarily limited to the mobile system and may be a PC, a laptop computer, a server, a media player, or an automotive device (e.g., a navigation device).

Referring to FIG. 21, the system 3000 may include a main processor 3100, memories (e.g., 3200a and 3200b), and storage devices (e.g., 3300a and 3300b). In addition, the system 3000 may include at least one of an image capturing device 3410, a user input device 3420, a sensor 3430, a communication device 3440, a display 3450, a speaker 3460, a power supplying device 3470, and a connecting interface 3480.

The main processor 3100 may control all operations of the system 3000, more specifically, operations of other components included in the system 3000. The main processor 3100 may be implemented as a general-purpose processor, a dedicated processor, or an application processor.

The main processor 3100 may include at least one CPU core 3110 and further include a controller 3120 configured to control the memories 3200a and 3200b and/or the storage devices 3300a and 3300b. In some embodiments, the main processor 3100 may further include an accelerator 3130, which is a dedicated circuit for a high-speed data operation, such as an artificial intelligence (AI) data operation. The accelerator 3130 may include a graphics processing unit (GPU), a neural processing unit (NPU) and/or a data processing unit (DPU) and be implemented as a chip that is physically separate from the other components of the main processor 3100.

The memories 3200a and 3200b may be used as main memory devices of the system 3000. Although each of the memories 3200a and 3200b may include a volatile memory, such as static random access memory (SRAM) and/or dynamic RAM (DRAM), each of the memories 3200a and 3200b may include non-volatile memory, such as a flash memory, phase-change RAM (PRAM) and/or resistive RAM (RRAM). The memories 3200a and 3200b may be implemented in the same package as the main processor 3100.

The storage devices 3300a and 3300b may serve as non-volatile storage devices configured to store data regardless of whether power is supplied thereto, and have larger storage capacity than the memories 3200a and 3200b. The storage devices 3300a and 3300b may respectively include storage controllers (STRG CTRL) 3310a and 3310b and NVM (Non-Volatile Memory)s 3320a and 3320b configured to store data via the control of the storage controllers 3310a and 3310b. Although the NVMs 3320a and 3320b may include flash memories having a two-dimensional (2D) structure or a three-dimensional (3D) V-NAND structure, the NVMs 3320a and 3320b may include other types of NVMs, such as PRAM and/or RRAM.

The storage devices 3300a and 3300b may be physically separated from the main processor 3100 and included in the system 3000 or implemented in the same package as the main processor 3100. In addition, the storage devices 3300a and 3300b may have types of solid-state devices (SSDs) or memory cards and be removably combined with other components of the system 3000 through an interface, such as the connecting interface 3480 that will be described below. The storage devices 3300a and 3300b may be devices to which a standard protocol, such as a universal flash storage (UFS), an embedded multi-media card (eMMC), or a non-volatile memory express (NVMe), is applied, without being limited thereto.

The image capturing device 3410 may capture still images or moving images. The image capturing device 3410 may include a camera, a camcorder, and/or a webcam.

The user input device 3420 may receive various types of data input by a user of the system 3000 and include a touch pad, a keypad, a keyboard, a mouse, and/or a microphone.

The sensor 3430 may detect various types of physical quantities, which may be obtained from the outside of the system 3000, and convert the detected physical quantities into electric signals. The sensor 3430 may include a temperature sensor, a pressure sensor, an illuminance sensor, a position sensor, an acceleration sensor, a biosensor, and/or a gyroscope sensor.

The communication device 3440 may transmit and receive signals between other devices outside the system 3000 according to various communication protocols. The communication device 3440 may include an antenna, a transceiver, and/or a modem.

The display 3450 and the speaker 3460 may serve as output devices configured to respectively output visual information and auditory information to the user of the system 3000.

The power supplying device 3470 may appropriately convert power supplied from a battery (not shown) embedded in the system 3000 and/or an external power source, and supply the converted power to each of components of the system 3000.

The connecting interface 3480 may provide connection between the system 3000 and an external device, which is connected to the system 3000 and capable of transmitting and receiving data to and from the system 3000. The connecting interface 3480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to the present disclosure, a UFS host may be configured to reconfigure a turbo write buffer of a UFS device. User storage may be secured by reconfiguring the turbo write buffer, and thus, the reduction in performance caused by a flush operation or an insufficient space of the user storage may be prevented. Accordingly, an operation method of a UFS host having improved performance and an operation method of a UFS system having improved performance are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of a universal flash storage (UFS) host configured to control a UFS device including a write booster buffer and a user storage area, the method comprising:
sending a first query request UFS protocol information unit (UPIU) for reading hint information about reconfiguring the write booster buffer to the UFS device;
receiving a first response UPIU corresponding to the first query request UPIU from the UFS device;
sending a second query request UPIU for reconfiguring the write booster buffer to the UFS device;
receiving a second response UPIU corresponding to the second query request UPIU from the UFS device;
reconfiguring the write booster buffer based on the hint information obtained from the UFS device without a reset or an initialization of the UFS device;
sending a third query request UPIU checking a change status of the write booster buffer to the UFS device; and
receiving a third response UPIU corresponding to the third query request UPIU,
wherein a first memory cell corresponding to the write booster buffer is configured to store N-bit data, where N is a natural number, a second memory cell corresponding to the user storage area is configured to store M-bit data, where M is a positive integer greater than N, and a write booster buffer capacity adjustment factor field of at least one descriptor indicates information about M.

2. The method of claim 1, wherein reconfiguring the write booster buffer includes reconfiguring a size of the write booster buffer based on a field of at least one of a unit descriptor in the UFS device, a device descriptor in the UFS device, or a geometry descriptor in the UFS device.

3. The method of claim 1, wherein reconfiguring the write booster buffer includes reconfiguring a size of the write booster buffer based on a field of attributes in the UFS device, the field including information about the hint information.

4. The method of claim 1, wherein checking the change status of the write booster buffer includes checking a field indicating a current write booster buffer size of attributes in the UFS device.

5. The method of claim 1, wherein the hint information includes information about an available space of the write booster buffer of the UFS device.

6. The operation method of claim 1, wherein a size of the user storage area increases or decreases as a size of the write booster buffer is changed by reconfiguring the write booster buffer.

7. A universal flash storage (UFS) device including descriptors, the UFS device comprising:
    a nonvolatile memory including a write booster buffer area and a user storage area; and
    a device controller configured to manage the nonvolatile memory through a logical unit and perform a write command provided from a UFS host, the device controller configured to,
        receive a first query request UFS protocol information unit (UPIU) from the UFS host for reading hint information about reconfiguring a write booster buffer,
        transmit a first response UPIU corresponding to the first query request UPIU to the UFS host,
        receive a second query request UPIU from the UFS host for reconfiguring the write booster buffer,
        transmit a second response UPIU corresponding to the second query request UPIU to the UFS host,
        reconfigure the write booster buffer based on the hint information obtained from the UFS device without a reset or an initialization of the UFS device,
        receive a third query request UPIU from the UFS host for checking a change status of the write booster buffer, and
        transmit a third response UPIU corresponding to the third query request UPIU to the UFS host,
    wherein a first memory cell corresponding to the write booster buffer is configured to store N-bit data, where N is a natural number, a second memory cell corresponding to the user storage area is configured to store M-bit data, where M is a positive integer greater than N, and a write booster buffer capacity adjustment factor field of at least one of the descriptors indicates information about M.

8. The UFS device of claim 7, wherein the at least one of the descriptors includes at least one of a unit descriptor, a device descriptor, attributes of the UFS device, or a geometry descriptor.

9. The UFS device of claim 8, wherein reconfiguring the write booster buffer includes reconfiguring a size of a write booster buffer by setting a field of attributes of the UFS device.

10. The UFS device of claim 8, wherein the UFS device is configured to reconfigure a size of the write booster buffer by setting at least one of a write booster buffer allocation number field per logical unit of the unit descriptor, a shared write booster buffer allocation unit number field of the device descriptor, a current write booster buffer size field of the attributes, a write booster buffer maximum size field of the geometry descriptor, or a write booster buffer capacity adjustment factor field of the geometry descriptor.

11. The UFS device of claim 7, wherein the UFS device is configured to set information about a current size of the write booster buffer at a current write booster buffer size field of attributes of the UFS device.

12. The operation method of claim 6, wherein a size of the user storage area increases or decreases as a size of the write booster buffer is changed by reconfiguring the write booster buffer.

13. An operation method of a universal flash storage (UFS) system including a UFS host and a UFS device, the method comprising:
    sending, by the UFS host, a first query request UFS protocol information unit (UPIU) to the UFS device;
    sending, by the UFS device, a first query response UPIU including hint information about reconfiguring a write booster buffer of the UFS device to the UFS host in response to the first query request UPIU;
    sending, by the UFS host, a second query request UPIU to the UFS device in response to the first query response UPIU;
    reconfiguring, by the UFS device, the write booster buffer in response to the second query request UPIU without a reset or an initialization of the UFS device;
    sending, by the UFS device, a second query response UPIU to the UFS host;
    sending, by the UFS host, a third query request UPIU to the UFS device; and
    sending, by the UFS device, a third query response UPIU including information about a change status of the write booster buffer to the UFS host,
    wherein a first memory cell corresponding to the write booster buffer is configured to store N-bit data, where N is a natural number, a second memory cell corresponding to a user storage area is configured to store M-bit data, where M is a positive integer greater than N, and a write booster buffer capacity adjustment factor field of at least one descriptor indicates information about M.

14. The operation method of claim 13, wherein the hint information includes information about an available space of the write booster buffer of the UFS device.

15. The operation method of claim 13, wherein reconfiguring, by the UFS device, the write booster buffer includes:
    changing, by the UFS device, a write booster buffer field of at least one of a unit descriptor in the UFS device, a device descriptor in the UFS device, or a geometry descriptor in the UFS device.

16. The operation method of claim 13, wherein reconfiguring, by the UFS device, the write booster buffer includes changing a size, a type, or a mode of the write booster buffer.

17. The operation method of claim 13, wherein the information about a change status of the write booster buffer includes a field indicating a current write booster buffer size of attributes of the UFS device.

18. The operation method of claim 13, further comprising:
    configuring, by the UFS host, the write booster buffer of the UFS device during an initialization of the UFS device.

19. The operation method of claim 13, wherein a size of a user storage area of the UFS device increases or decreases as a size of the write booster buffer is changed by reconfiguring the write booster buffer.

* * * * *